(12) United States Patent
Banerjee et al.

(10) Patent No.: US 12,603,565 B2
(45) Date of Patent: Apr. 14, 2026

(54) INTEGRATED MULTI-PORT GENERATOR-RECTIFIER DEVICE AND METHOD

(71) Applicant: The Board of Trustees of the University of Illinois, Urbana, IL (US)

(72) Inventors: Arijit Banerjee, Urbana, IL (US); Kiruba Sivasubramaniam Haran, Champaign, IL (US); Phuc Huynh, Urbana, IL (US); Anjana Jayasanka Samarakoon, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 503 days.

(21) Appl. No.: 18/182,610

(22) Filed: Mar. 13, 2023

(65) Prior Publication Data

US 2023/0299659 A1     Sep. 21, 2023

Related U.S. Application Data

(60) Provisional application No. 63/319,858, filed on Mar. 15, 2022.

(51) Int. Cl.
| | |
|---|---|
| *H02P 9/00* | (2006.01) |
| *H02J 3/01* | (2006.01) |
| *H02M 1/14* | (2006.01) |

(52) U.S. Cl.
CPC ............... *H02M 1/143* (2013.01); *H02J 3/01* (2013.01); *H02J 2300/28* (2020.01)

(58) Field of Classification Search
CPC .......... H02M 1/43; H02J 3/01; H02J 2300/28; H02K 21/16
See application file for complete search history.

(56) References Cited

U.S. PATENT DOCUMENTS

| | | | |
|---|---|---|---|
| 6,894,413 B2 | 5/2005 | Nakano et al. | |
| 11,183,946 B2 | 11/2021 | Huynh et al. | |
| 2001/0028201 A1* | 10/2001 | Miyashita | H02K 1/276 |
| | | | 310/254.1 |
| 2002/0158521 A1* | 10/2002 | Sakamoto | H02K 1/145 |
| | | | 310/49.44 |
| 2011/0316287 A1* | 12/2011 | Stiesdal | H02K 11/05 |
| | | | 290/55 |

(Continued)

OTHER PUBLICATIONS

Andresen, et al., "A high power density converter system for the Gamesa G10x 4,5 MW Wind turbine", European Conference on Power Electronics and Applications, 2007, pp. 1-8.

(Continued)

*Primary Examiner* — Rexford N Barnie
*Assistant Examiner* — Esayas G Yeshaw
(74) *Attorney, Agent, or Firm* — Greer, Burns & Crain, Ltd.; Steven P. Fallon

(57)     ABSTRACT

An integrated multi-port generator-rectifier device includes multiple passive output ports provided from a plurality of passive-rectifier windings on a common, single magnetic structure. The passive-rectifier windings interact with a plurality of magnetic poles. Coils in the passive rectifier windings are serially connected. Each of the passive rectifier windings has a pitch as that is a fraction of magnet pole pitch and a pattern to magnetically decouple back emf phases of the separate rectifiers. The device further includes an active port provided by an active rectifier.

14 Claims, 26 Drawing Sheets

(56)                 References Cited

U.S. PATENT DOCUMENTS

| | | | |
|---|---|---|---|
| 2015/0008786 A1* | 1/2015 | Endo | H02K 21/22 |
| | | | 310/216.069 |
| 2018/0262137 A1* | 9/2018 | Rozman | H02P 9/48 |
| 2023/0231425 A1* | 7/2023 | Nashiki | H02K 1/278 |
| | | | 310/40 R |
| 2024/0006889 A1* | 1/2024 | Banerjee | H02J 3/381 |

OTHER PUBLICATIONS

Birk, et al., "Parallel-connected converters for optimizing efficiency, reliability and grid harmonics in a wind turbine", IEEE Xplore, 2007, pp. 1-7.

Di Gerlando, et al., "Analysis and Test of Diode Rectifier Solutions in Grid-Connected Wind Energy Conversion Systems Employing Modular Permanent-Magnet Synchronous Generators", IEEE Transactions on Industrial Electronics, 2012, vol. 59, No. 5, pp. 2135-2146.

Huynh, et al., "Active Voltage-Ripple Compensation in an Integrated Generator-Rectifier System", IEEE Transactions on Power Electronics, 2021, vol. 36, No. 2, pp. 2270-2282.

Huynh, et al., "Maximum Power Point Tracking for Wind Turbine Using Integrated Generator-Rectifier Systems", IEEE Transactions on Power Electronics, vol. 36, No. 1, pp. 504-512.

Huynh, et al., "An Integrated Permanent-Magnet-Synchronous Generator-Rectifier Architecture for Limited-Speed-Range Applications", IEEE Transactions on Power Electronics, vol. 35, No. 5, pp. 4767-4779.

Polinder, et al., "Comparison of Direct-Drive and Geared Generator Concepts for Wind Turbines", IEEE Transactions on Energy Conversion, vol. 21, No. 3, pp. 725-733.

* cited by examiner

Table 1

REQUIRED INDUCTANCE MATRIX FOR RLE REPRESENTATION OF ALL GENERATOR PHASES

| Phase | $A_{p1}$ | $B_{p1}$ | $C_{p1}$ | $A_{p2}$ | $B_{p2}$ | $C_{p2}$ | ... | $A_{pk}$ | $B_{pk}$ | $C_{pk}$ |
|---|---|---|---|---|---|---|---|---|---|---|
| $A_{p1}$ | $L_{a1}$ | $M_1$ | $M_1$ | $M_{12}$ | $M_{12}$ | $M_{12}$ | ... | $M_{1k}$ | $M_{1k}$ | $M_{1k}$ |
| $B_{p1}$ | $M_1$ | $L_{a1}$ | $M_1$ | $M_{12}$ | $M_{12}$ | $M_{12}$ | ... | $M_{1k}$ | $M_{1k}$ | $M_{1k}$ |
| $C_{p1}$ | $M_1$ | $M_1$ | $L_{a1}$ | $M_{12}$ | $M_{12}$ | $M_{12}$ | ... | $M_{1k}$ | $M_{1k}$ | $M_{1k}$ |
| $A_{p2}$ | $M_{12}$ | $M_{12}$ | $M_{12}$ | $L_{a2}$ | $M_2$ | $M_2$ | ... | $M_{2k}$ | $M_{2k}$ | $M_{2k}$ |
| $B_{p2}$ | $M_{12}$ | $M_{12}$ | $M_{12}$ | $M_2$ | $L_{a2}$ | $M_2$ | ... | $M_{2k}$ | $M_{2k}$ | $M_{2k}$ |
| $C_{p2}$ | $M_{12}$ | $M_{12}$ | $M_{12}$ | $M_2$ | $M_2$ | $L_{a2}$ | ... | $M_{2k}$ | $M_{2k}$ | $M_{2k}$ |
| ... | ... | ... | ... | ... | ... | ... | ... | ... | ... | ... |
| $A_{pk}$ | $M_{1k}$ | $M_{1k}$ | $M_{1k}$ | $M_{2k}$ | $M_{2k}$ | $M_{2k}$ | ... | $L_{ak}$ | $M_k$ | $M_k$ |
| $B_{pk}$ | $M_{1k}$ | $M_{1k}$ | $M_{1k}$ | $M_{2k}$ | $M_{2k}$ | $M_{2k}$ | ... | $M_k$ | $L_{ak}$ | $M_k$ |
| $C_{pk}$ | $M_{1k}$ | $M_{1k}$ | $M_{1k}$ | $M_{2k}$ | $M_{2k}$ | $M_{2k}$ | ... | $M_k$ | $M_k$ | $L_{ak}$ |

| | Active port | Passive port |
|---|---|---|
| Active port | $L_{AA}$ | $L_{AP}$ |
| Passive port | $L_{AP}^T$ | $L_{PP}$ |

| Quantity | Notation | Unit | Value |
|---|---|---|---|
| Magnet pole pitch | $L_p$ | mm | 147 |
| Center-coil distance | $L_c$ | mm | 213.6 |
| Coil-opening pitch | $L_o$ | mm | 22 |
| Stack length | $L_s$ | mm | 1250 |
| Rotor inner radius | $R$ | mm | 6000 |
| Rotor yoke width | $x_1$ | mm | 15.6 |
| Magnet width | $x_2$ | mm | 68 |
| Air-gap width | $g$ | mm | 12 |
| Coil width | $x_3$ | mm | 25.7 |
| Stator yoke width | $x_4$ | mm | 25.7 |
| Number of poles | $N_p$ | | 260 |
| Number of coils | $N_c$ | | 280 |
| Phase peak back emf | $E_i$ | V | 1934 |
| Rated frequency | $f_0$ | Hz | 20.8 |
| Base voltage | $V_{base}$ | V | 9475 |
| Base power | $P_{base}$ | MW | 10 |
| Base impedance | $Z_{base}$ | Ω | 9 |
| Dc-bus voltage | $V_{dc}$ | kV | 11.5 |
| Dc-bus current | $I_{dc0}$ | A | 869 |
| Phase reactance | $X_{Li}^{pm}$ | pu | 0.043 |
| Phase resistance | $R_i^{pm}$ | pu | 0.011 |
| Filter capacitance | $C$ | mF | 90 |

FIG. 14B

INTEGRATED MULTI-PORT GENERATOR-RECTIFIER DEVICE AND METHOD

PRIORITY CLAIM AND REFERENCE TO RELATED APPLICATION

The application claims priority under 35 U.S.C. § 119 and all applicable statutes and treaties from prior U.S. provisional application Ser. No. 63/319,858 which was filed Mar. 15, 2022.

STATEMENT OF GOVERNMENT INTEREST

This invention was made with government support under DE-AR0001057 awarded by the US Department of Energy. The government has certain rights in the invention.

FIELD

Fields of the invention includes power generation and rectification. An example application of the invention is to a wind-energy power generation system.

BACKGROUND

One conventional three-phase generation-rectification configuration includes overlapping coils, which results in three phases being output. The back emf (counter electromotive force) of each phase is displaced 120 degrees with respect to the other two phases. The phases are disadvantageously coupled to each other because the mutual inductance is comparable to the self-inductance. H. Polinder, F. F. A. van der Pijl, G.-. de Vilder and P. J. Tavner, "Comparison of direct-drive and geared generator concepts for wind turbines," in IEEE Transactions on Energy Conversion, vol. 21, no. 3, pp. 725-733, September 2006, doi: 10.1109/TEC.2006.875476. The coupling creates significant ripple in the DC rectified output.

Another conventional three-phase configuration exemplified in Nakano et al. U.S. Pat. No. 6,894,413 includes non-overlapping coils. This also outputs three phases. The back emf of each phase is displaced 120 degrees with respect to the other two phases. Mutual inductance among phases is weaker than in the overlapping coil confirmation. A disadvantage of this approach is DC output voltage ripple percentage would be 14% of the average value when rectified by a capacitor-less six-pulse diode bridge.

A conventional multi-port configuration uses a multi-port generator combined with active rectifier for each of the ports. The angular displacement among phases follows the conventional value (120 degrees). B. Andresen and J. Birk, "A high power density converter system for the Gamesa G10x 4.5 MW wind turbine," 2007 European Conference on Power Electronics and Applications, 2007, pp. 1-8, doi: 10.1109/EPE.2007.4417312; J. Birk and B. Andresen, "Parallel-connected converters for optimizing efficiency, reliability and grid harmonics in a wind turbine," in 2007 European Conference on Power Electronics and Applications, September 2007, pp. 1-7. The requirement for multiple active rectifiers is disadvantageous because the entire output power is processed by active switches, leading to high conversion losses because the loss mechanism includes both switching and conduction.

Axial-split machines include a plurality of passive-rectifier ports, each of which is axially split. The magnets relative positions must be controlled to achieve the required phase shift. This approach may lead to complex bonding and alignment structures among different sections. A. Di Gerlando, G. Foglia, M. F. Iacchetti, and R. Perini, "Analysis and test of diode rectifier solutions in grid-connected wind energy conversion systems employing modular permanent-magnet synchronous generators," IEEE Transactions on Industrial Electronics, vol. 59, no. 5, pp. 2135-2146, May 2012. The complex control and structure is both expensive and can negatively affect long-term reliability.

Some of the present inventors have advanced the state of the art with Integrated Generator-Rectifier Systems that minimize ripple. For example, P. Huynh and A. Banerjee, U.S. Pat. No. 11,183,946, discloses an integrated generator-rectifier AC-DC conversion circuit and system that can include serially stacked passive and active rectifiers connected to multiple AC ports of an electrical power generator driven by mechanical energy captured by an energy harvester. The series-stacked passive rectifiers are power by multiple three-phase AC ports, each of the ports is implemented as a separate magnetic structure. While this avoids coupling between phases, each separate magnetic structure adds significant weight and significant expense.

Additional details about this basic design and improvements to it are found in the following publications: "An Integrated Permanent-Magnet-Synchronous Generator-Rectifier Architecture for Limited-Speed-Range Applications," in IEEE Transactions on Power Electronics, vol. 35, no. 5, pp. 4767-4779, May 2020, doi: 10.1109/TPEL.2019.2946244; P. Huynh, S. Tungare and A. Banerjee, "Maximum Power Point Tracking for Wind Turbine Using Integrated Generator-Rectifier Systems," in IEEE Transactions on Power Electronics, vol. 36, no. 1, pp. 504-512, January 2021, doi: 10.1109/TPEL.2020.3002254; P. Huynh and A. Banerjee, "Active Voltage-Ripple Compensation in an Integrated Generator-Rectifier System," in IEEE Transactions on Power Electronics, vol. 36, no. 2, pp. 2270-2282, February 2021, doi:10.1109/TPEL.2020.3006510.

SUMMARY OF THE INVENTION

A preferred embodiment is an integrated multi-port generator-rectifier device that includes multiple passive output ports provided from a plurality of passive-rectifier windings on a common, single magnetic structure. The passive-rectifier windings interact with a plurality of magnetic poles. Coils in the passive rectifier windings are serially connected. Each of the passive rectifier windings has a pitch as that is a fraction of magnet pole pitch and a pattern to magnetically decouple back emf phases of the separate rectifiers. The device further includes an active port provided by an active rectifier

DETAILED DESCRIPTION OF THE PREFERRED EMBODIMENTS

FIGS. 1A-1G illustrate a preferred embodiment integrated rectifier-generator that was tested in a small scale experiment; FIG. 1A shows the generator machine assembly; FIG. 1B shows the stator from the FIG. 1A generator machine with 36 coils; FIG. 1C is a partial view of the FIG. 1A magnet ring rotor; FIG. 1D shows the FIG. 1A complete magnet ring mounted on a rotor frame; FIG. 1E shows the back emf vectors of the experimental example 36-coil 34-pole combination; FIG. 1F shows an example connection pattern to achieve three three-phase sets shifted by 20° from each other; FIG. 1G shows the complete small scale experimental setup;

FIGS. 2A-2D illustrate electrical characteristics of the FIG. 1G experimental integrated generator-rectifier test system; FIG. 2A shows consecutive coils with a 170° phase shift; FIG. 2B shows back emfs of some phases being phase-shifted from each other by 20°; FIG. 2C shows back emfs of other phases being phase-shifted by 120° from each other; FIG. 2D shows that the inductance matrix of the integrated generator-rectifier shows dominant diagonal components;

FIGS. 3A-D show electrical characteristic of the integrated generator-rectifier system of FIG. 1G operating at 220 rpm and delivering 527 W to the DC bus; FIG. 3A shows that current is sinusoidal in the active port; FIG. 3B shows that while the passive port back emf is sinusoidal, the phase current is trapezoidal due to operation of the capacitor-less diode bridge; FIG. 3C shows that the DC bus experiences a low ripple current; FIG. 3D shows the DC-bus current frequency components;

FIG. 6 is an inductance matrix from an RLE (speed-dependent voltage source) representation of generator phases;

Figure 9A:
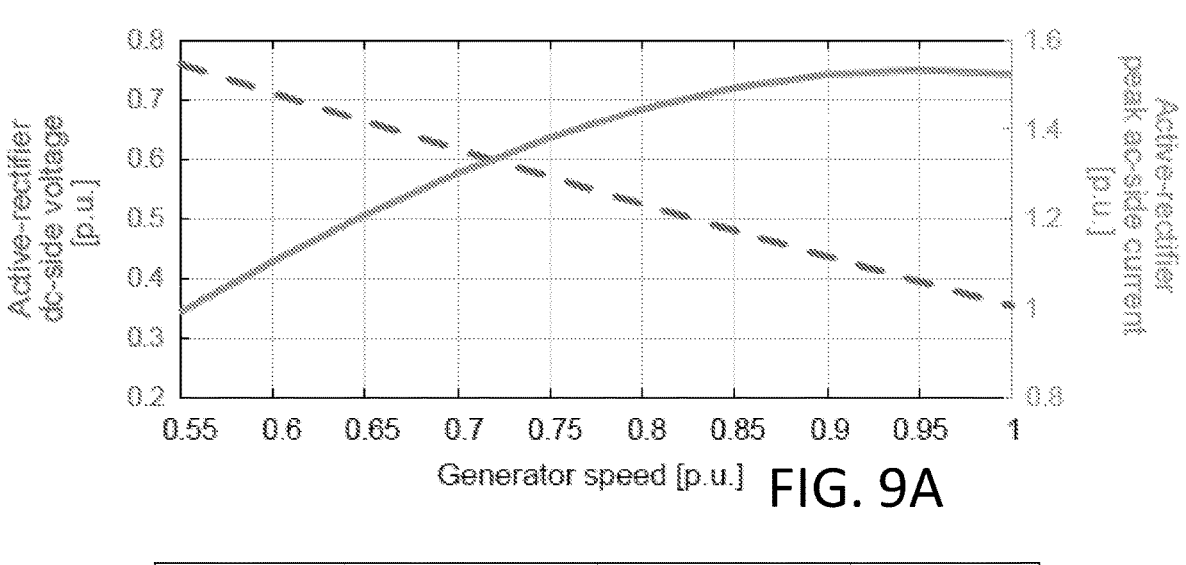
Figure 9B:
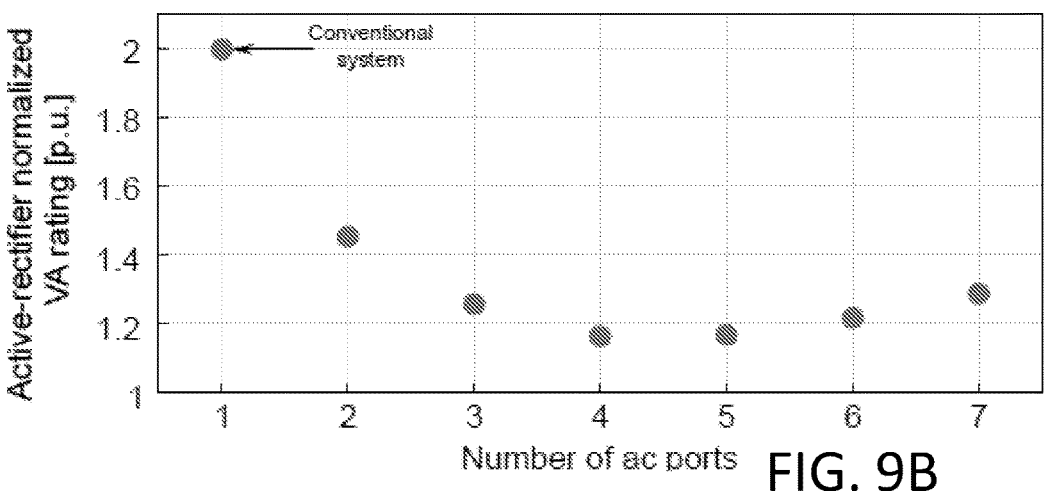
Figure 9C:
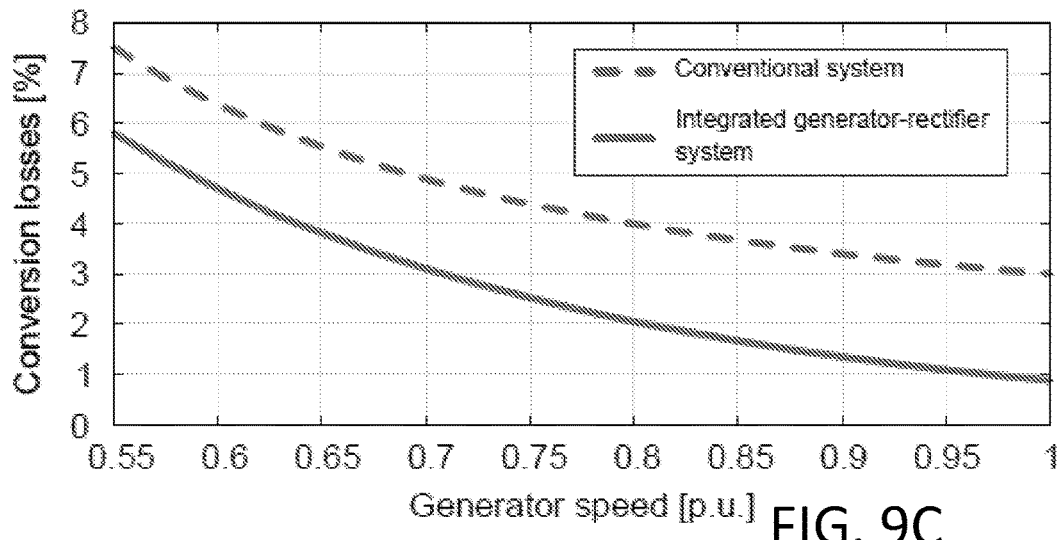
Figure 10A:
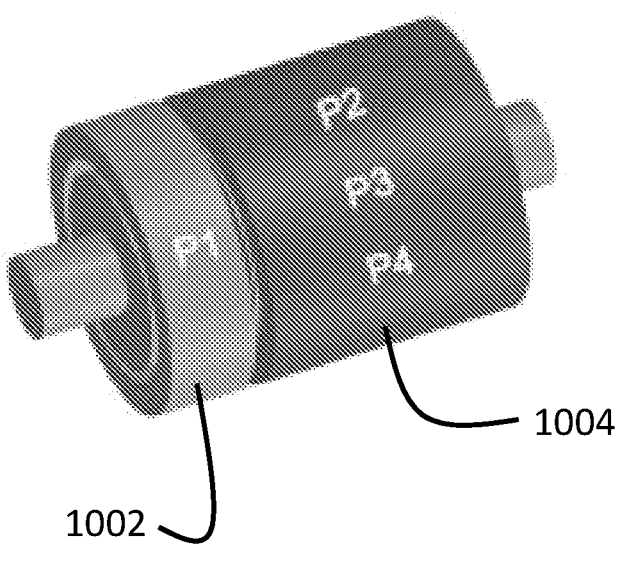
Figure 10B:
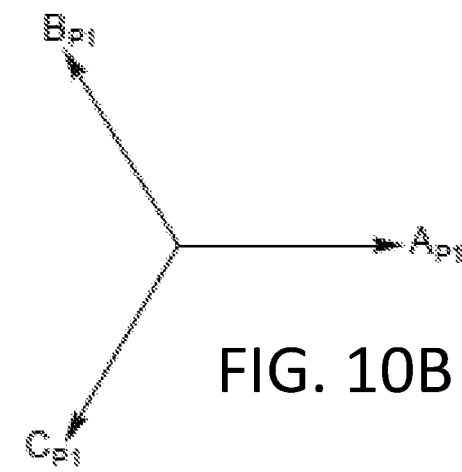
Figure 10C:
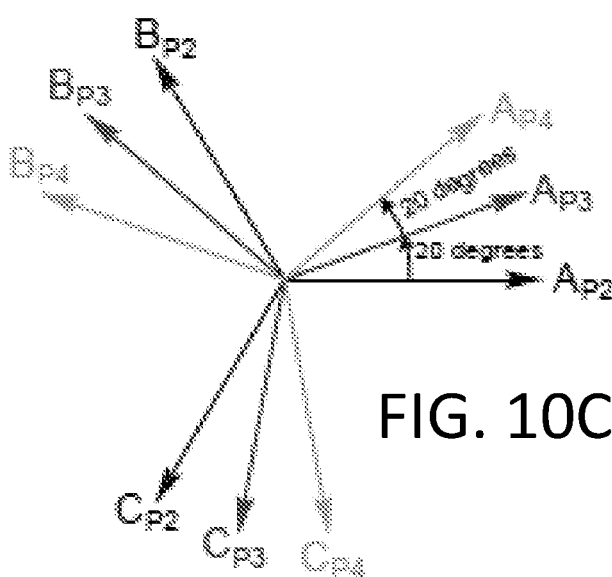
Figure 11A:
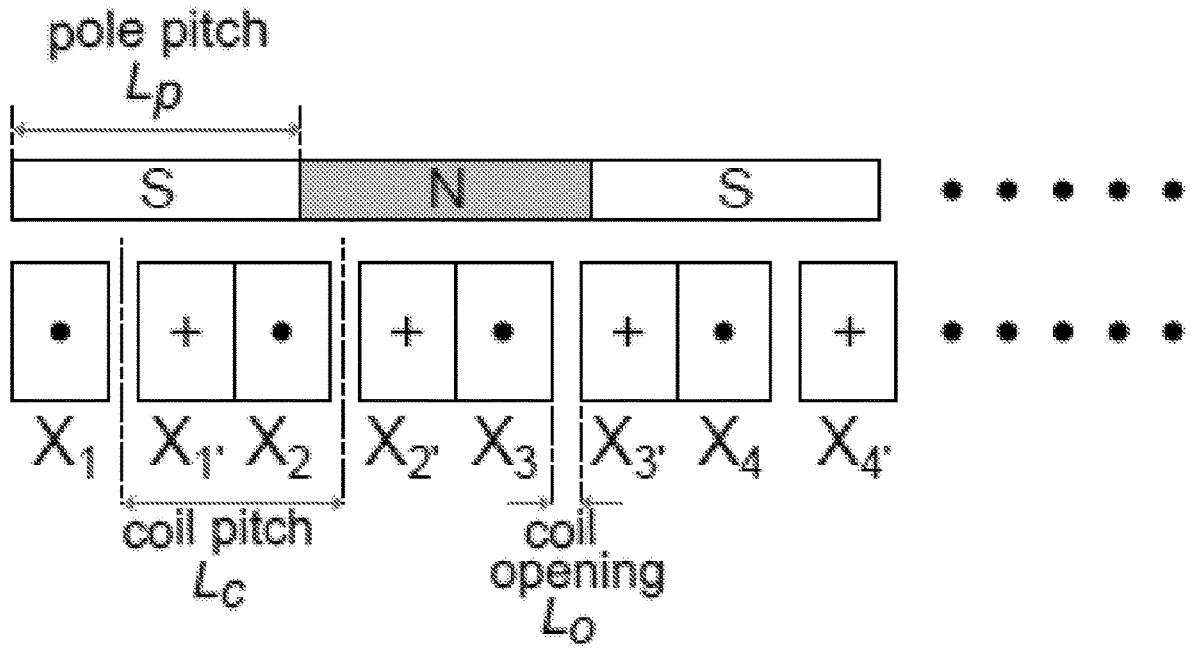
Figure 11B:
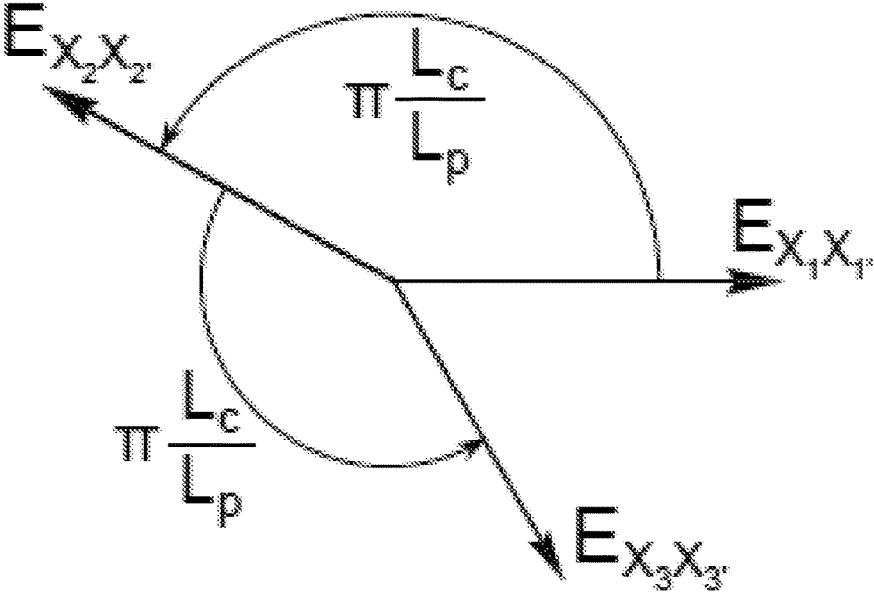
Figure 13A:
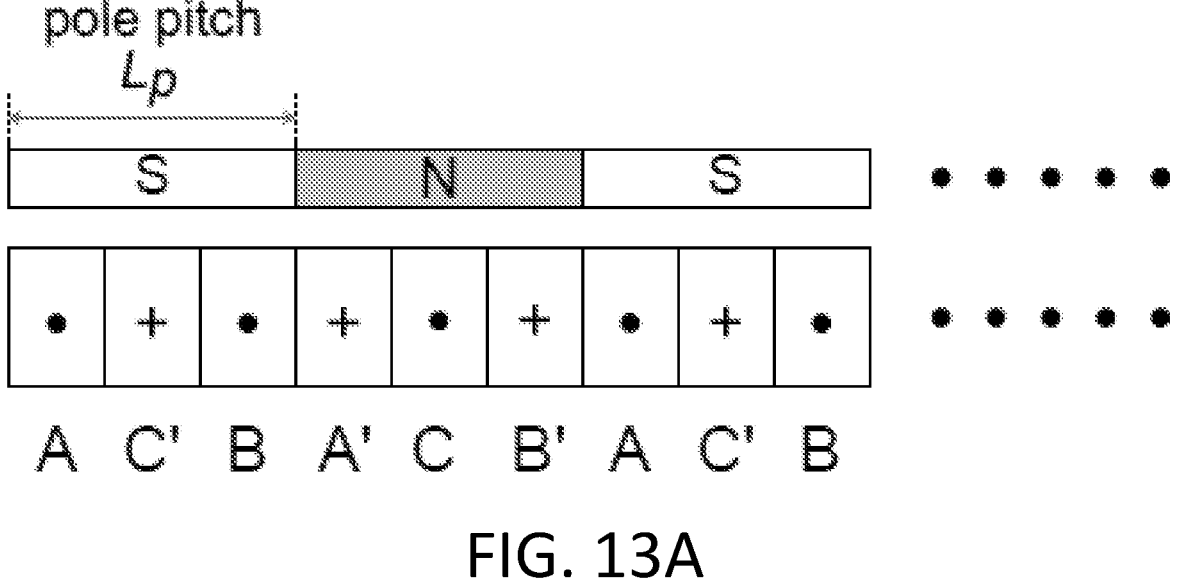
Figure 13B:
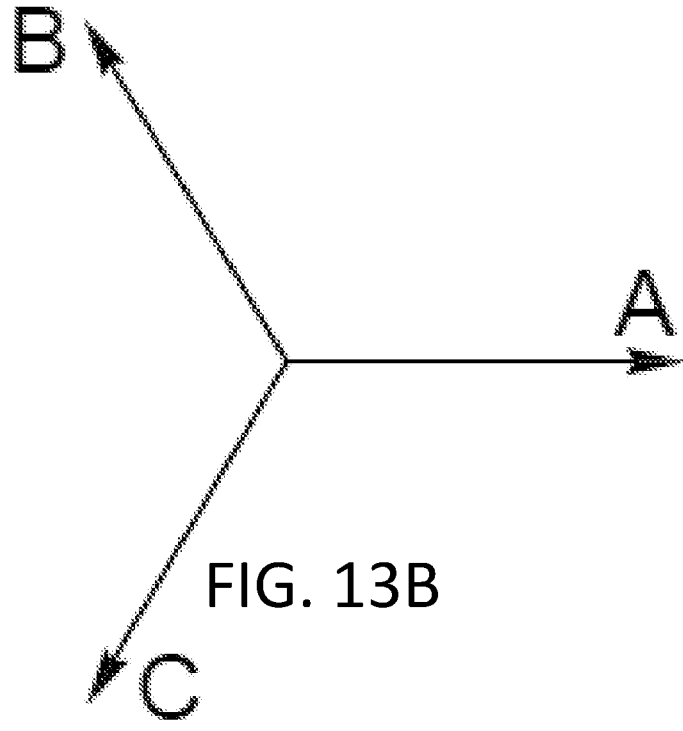

FIGS. 9A-9C illustrate characteristics of the preferred integrated generator-rectifier system; FIG. 9A has voltage and current of the partial-power-rated active rectifier based on a four port generator with 0.025 pu per-phase reactance; FIG. 9B shows variation in voltage and current ratings reduced the active-rectifier VA rating compared to the conventional all-active-rectifier topologies; FIG. 9C shows that the conversion losses are reduced across the entire generator's operating speed range as the majority of the power is processed on the high-efficiency passive rectifier;

FIGS. 10A-10C respectively show an axially-split generator for integrated rectification, voltage vectors of the active-rectifier port P1, and voltage vectors of passive-rectifier ports P2, P3, and P4;

FIGS. 11A-B respectively show a winding configuration of the passive-rectifier AC port of the FIG. 10A axially split generator and corresponding back emfs vectors;

FIGS. 12A-12D respectively show, for an example $$\frac{L_C}{L_P} = \frac{26}{18}$$

generator-rectifier, available voltage vectors, formation of three three-phase winding sets with 20° phase shift, the physical connection pattern, and non-zero part of the winding functions for different phases do not overlap;

FIGS. 13A-13B show an active-rectifier AC port winding configuration and the corresponding voltage vectors;

FIGS. 14A-14E are data of an FEA (finite element analysis) simulation of a commercial windmill having a generator-rectifier in accordance with the present invention; FIG.

Figure 14A:
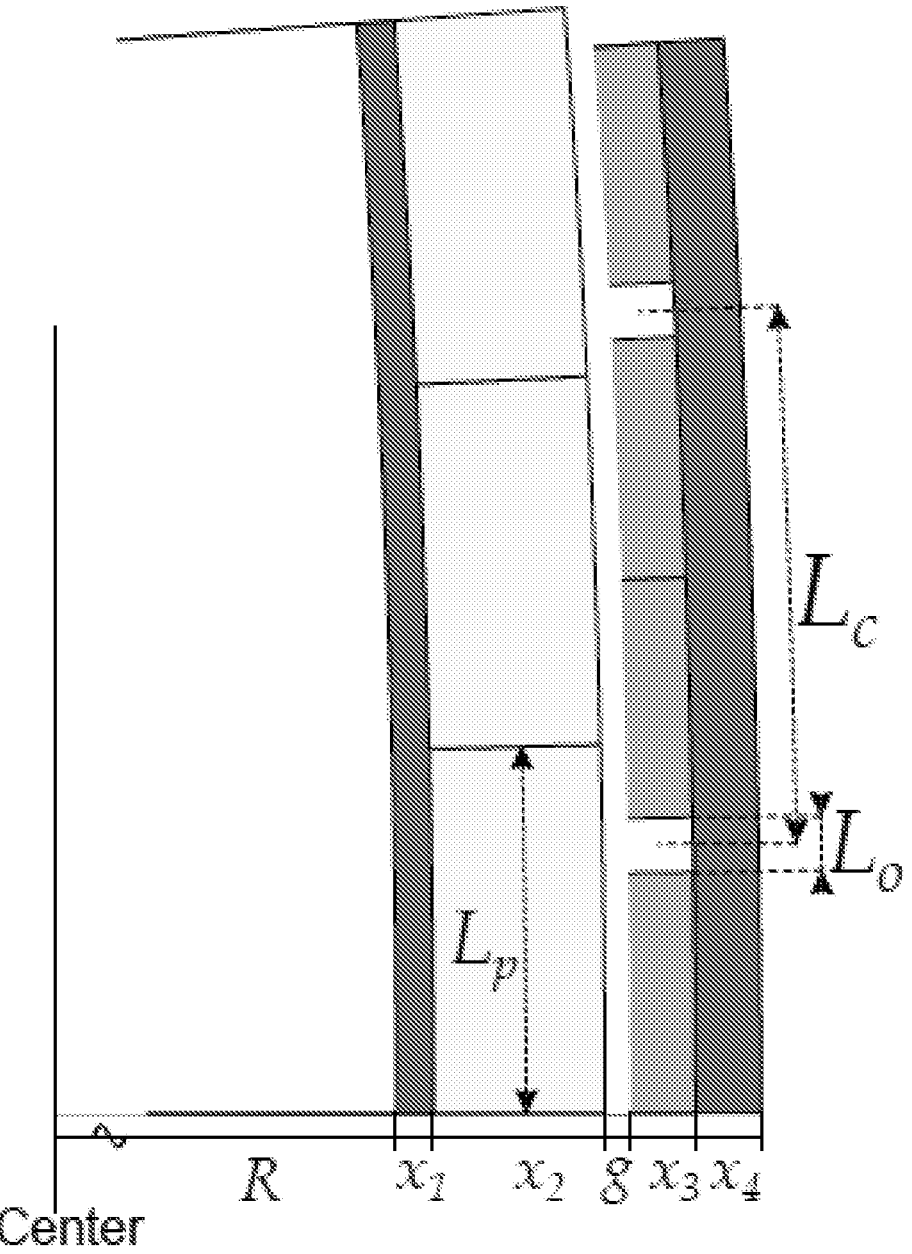
Figure 14C:
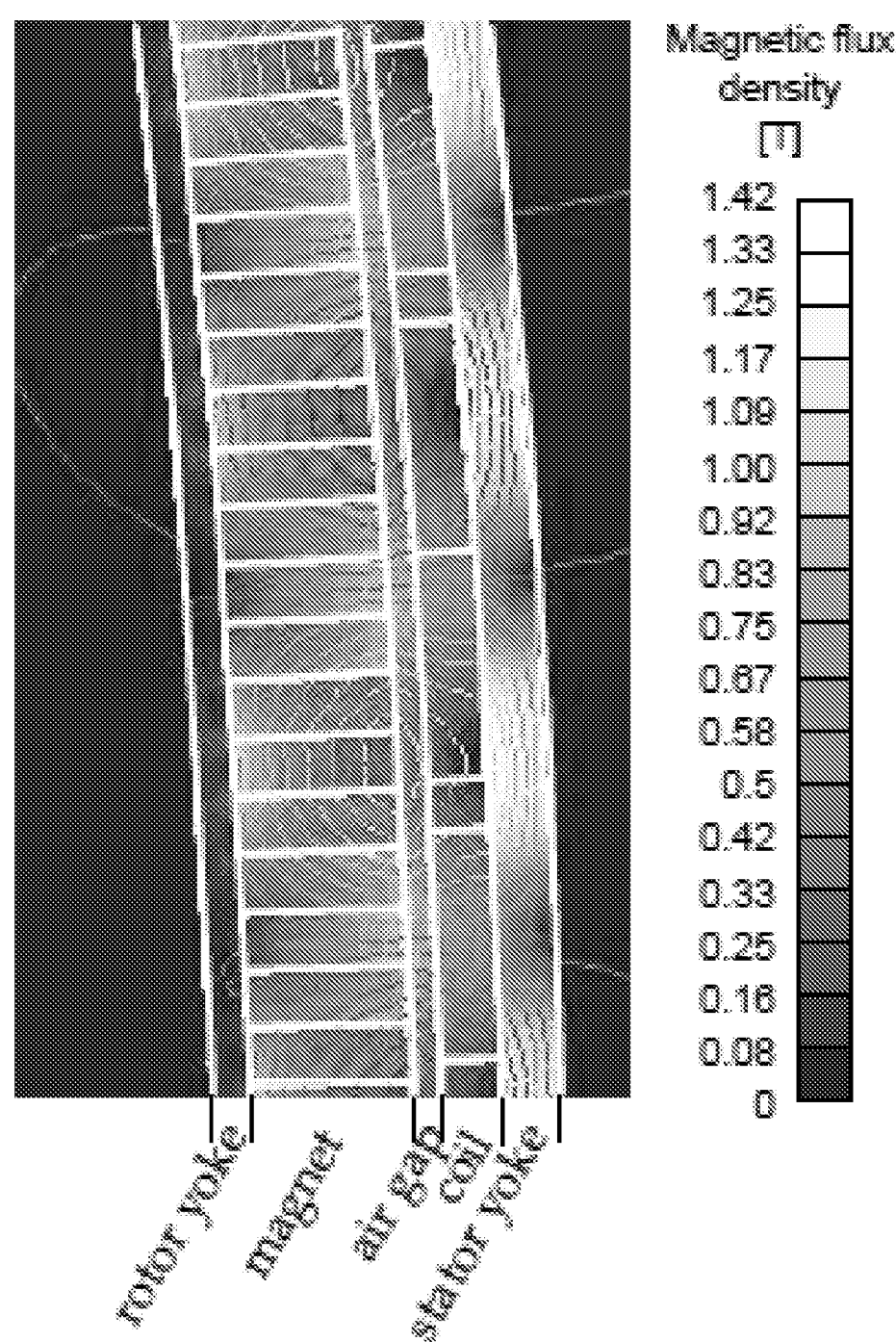
Figure 14D:
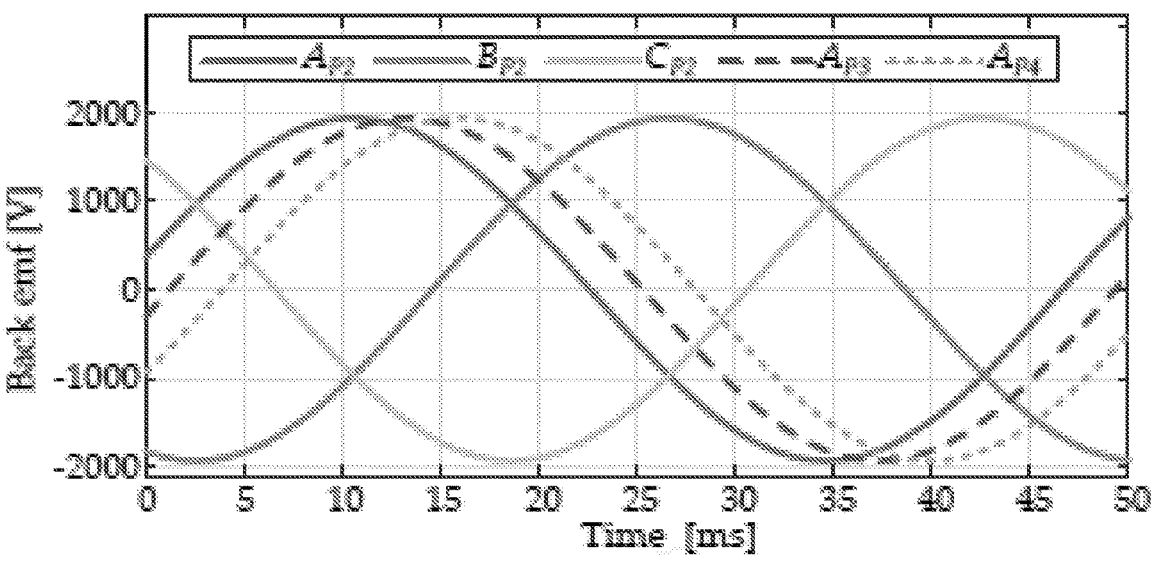
Figure 14E:
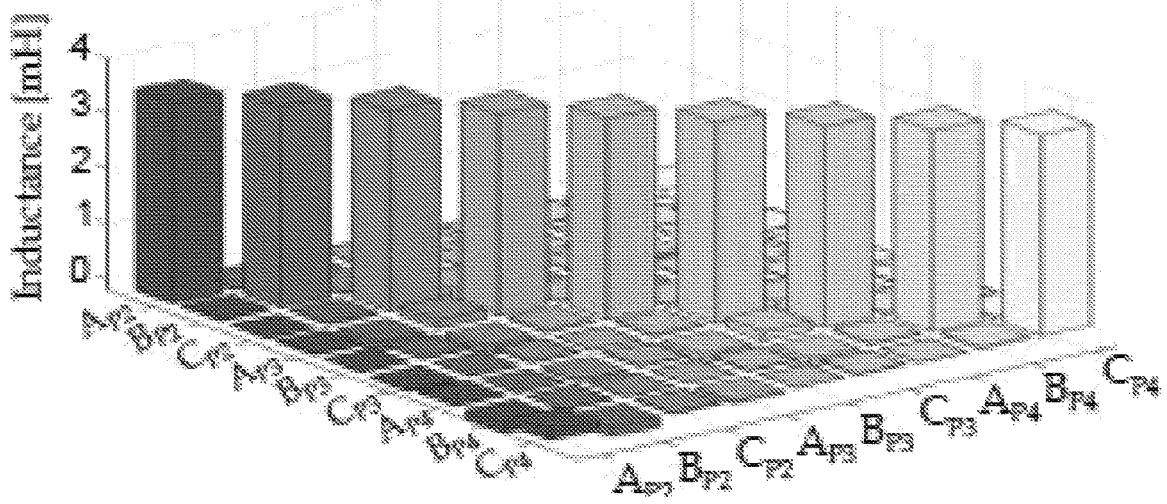
Figure 15A:
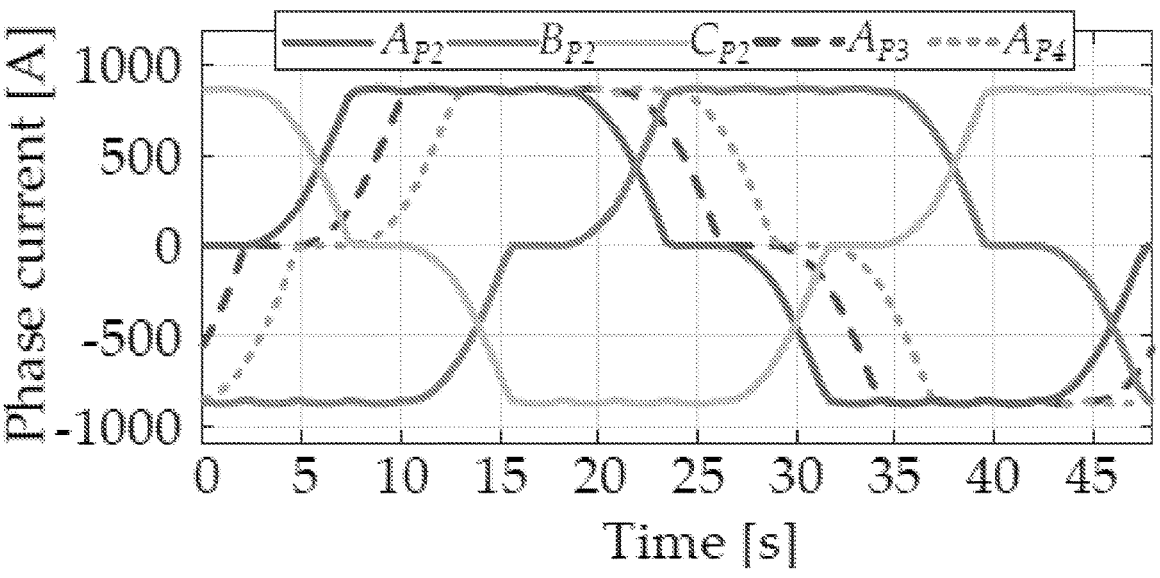
Figure 15B:
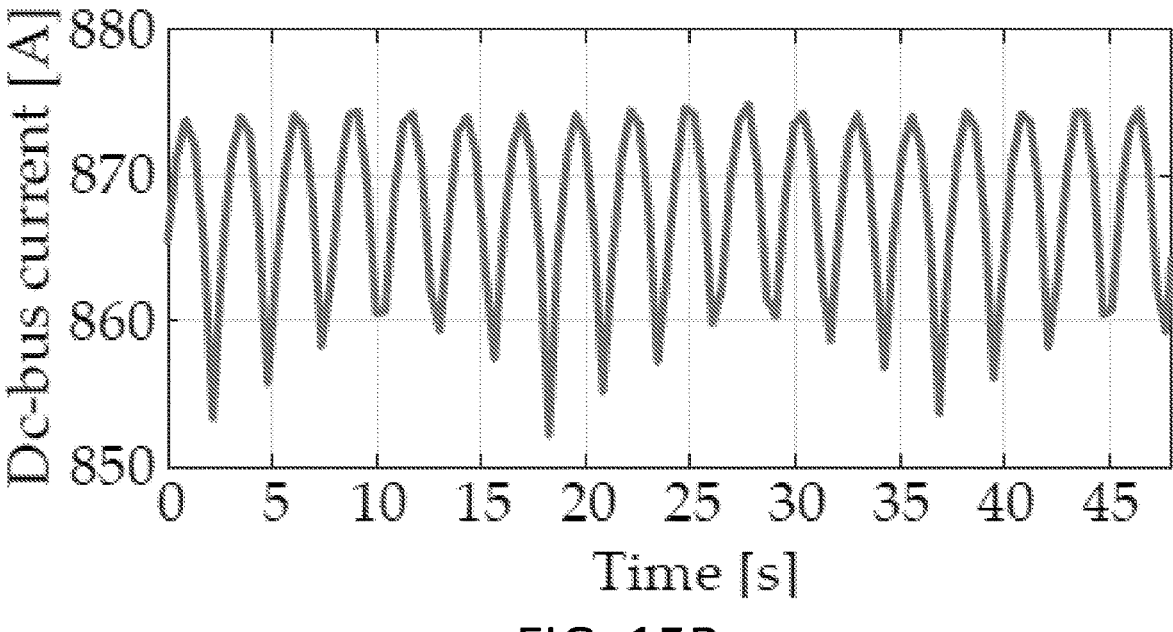
Figure 15C:
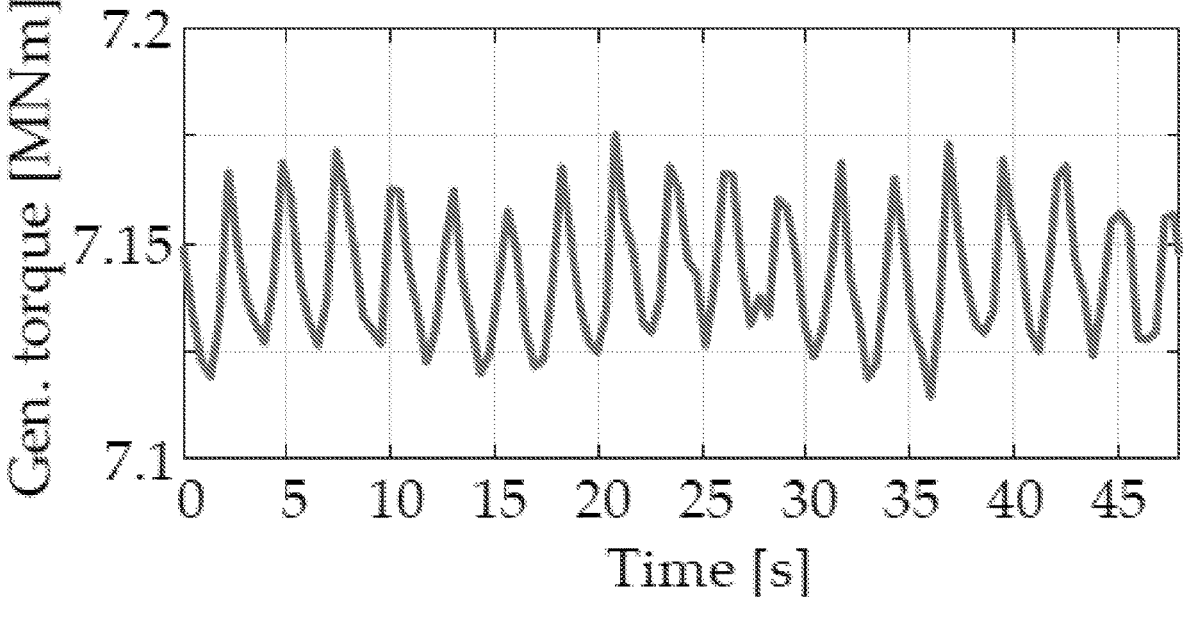

14A is a partial diagram showing the structural configuration of the generator FEA model; FIG. 14B is a table of generator dimensions and the corresponding electrical quantities; FIG. 14C shows the flux density of the FEA model; FIG. 14D shows that the induced back emf that has a 120° shift between phases in the same port and a 20° phase shift among different ports; FIG. 14E shows the inductance matrix is dominated by diagonal elements—self inductance—showing the magnetic decoupling between different phases; and FIGS. 15A-15C are data characterizing the FIGS. 14A-14E FEA simulation.

DETAILED DESCRIPTION OF THE PREFERRED EMBODIMENTS

A preferred integrated multi-port generator-rectifier includes a plurality of passive-rectifier windings on a common, single magnetic structure. The poles and windings are configured to magnetically decouple back emf phases of the separate rectifier windings, even though they share the same magnetic structure. Windings are serially connected such that the ratio between pole pitch and coil pitch is a non-integer number, i.e., a fractional-pole-pitch. Two or more coils that are serially connected form a phase winding. The winding function consists of two or more non-zero, bi-polar intervals with a zero average value. The product of any two winding functions is zero, leading to the zero mutual inductance.

In a preferred three-phase design, each of a primary back emf phase is 120° from the other primary phase. Each primary phase includes two secondary back emf phases at 20° from each other, with one being 20° from the primary back emf phase. There is preferably no DC-side filter capacitor, which allows voltage and current to be in phase. Despite eliminating DC-side filter capacitors, preferred integrated generator devices provides a very low ripple current on the order of 1% due to the phase shift between different passive-rectifier phase windings. More generally, the invention can be used to create three-phase winding sets (of a primary phase and secondary phase) that have an appropriate phase shift instead of the example 20° from the primary back emf phase. The phase shift only depends on how the ratio between coil pitch and pole pitch is set. Generally, the appropriate value of phase shift depends on the number of ports. The value for a k-port machine is 60/(k−1), which is 20 (an integer) for k=4 (a 4-port machine). As another example, with k=8, the value is 60/(8−1)=8.57, which is a non-integer value. As another example, with a 5-port machine, the selection is 60/(5−1)=15. The value of k to practice the invention must be at least 3, i.e. two passive ports connected in series with one active port.

A preferred generator includes multiple ports, one powers an active rectifier and the rest power capacitor-less passive rectifiers. The port powering the active rectifier is referred as active port, the ports powering the passive rectifiers are referred to as passive ports. The active port is axially split from the passive ports. The passive ports share a common and single magnetic structure containing a plurality of magnetic poles. Each passive port has a three-phase winding set, each phase is 120-degree phase shifted from the other two. A phase winding is formed by serially connected multiple coils. Each coil has a pitch that equals a fraction of the magnetic-pole pitch. The coil connection pattern makes each phase winding to have a zero-average winding function that consists of two non-zero, bi-pole intervals. This winding function property makes any two phases on the passive-port magnetic structure to be magnetically decoupled, leading to zero mutual inductance.

A preferred integrated multi-port generator-rectifier includes a generator having two sections that are axially split. One section powers an active rectifier and the other powers passive-rectifiers that are on a common, single magnetic structure. Angular displacement is achieved by making the coil pitch in the passive-rectifier windings a fraction of the pole pitch and displacement angle is controlled by setting the coil-pitch/pole-pitch fraction. Zero mutual coupling among phases is achieved with a connection pattern among the coils forming the phases that naturally balances the impacts of the generator phases on each other. Preferred generator-rectifiers can achieve a 1% DC voltage ripple when filtered by a capacitor-less diode bridge.

Preferred embodiments of the invention will now be discussed with respect to experiments and drawings. Broader aspects of the invention will be understood by artisans in view of the general knowledge in the art and the description of the experiments that follows.

Figure 1A:
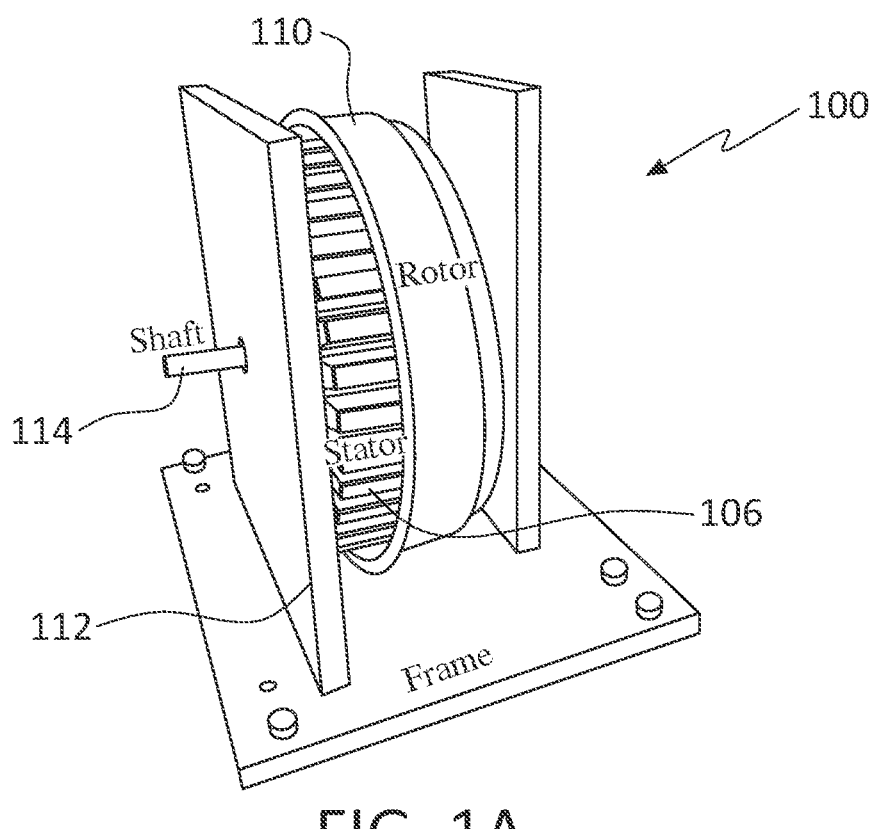
Figure 1B:
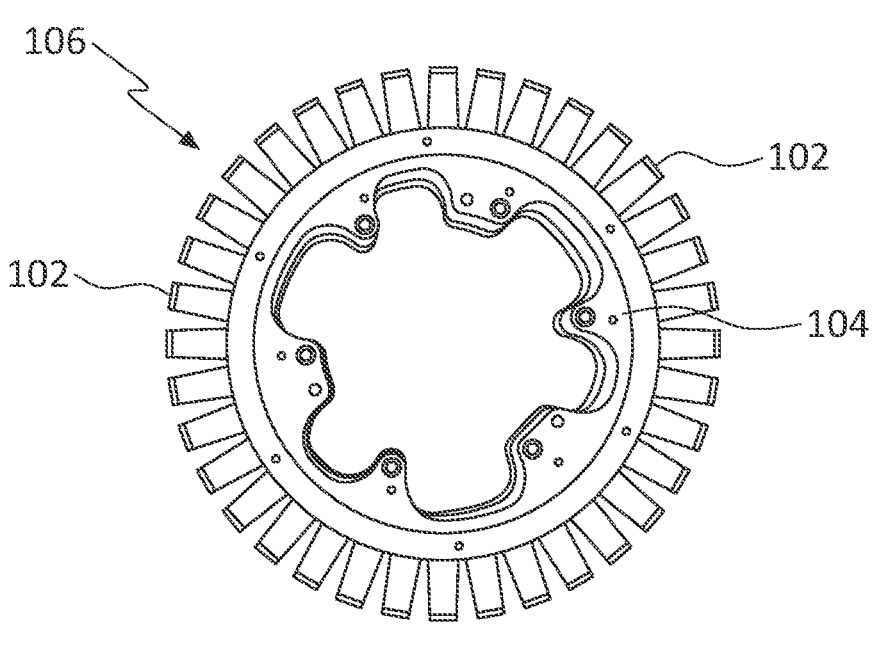

FIG. 1A shows a preferred integrated generator-rectifier 100 with plurality of passive-rectifier windings 102 on a common, single magnetic structure 104, which together form a stator 106 in the example generator-rectifier 100. A plurality of magnetic poles 108 (FIGS. 1B and 1C) are provided on a rotor 110. Serial connections connect the passive rectifier windings to define a pitch as a fraction of magnet pole pitch to magnetically decouple back emf phases of the separate rectifiers. The stator 106 is mounted to a frame 112, and the rotor 110 is mounted on a shaft 114 supported by the frame to allow for rotation of the rotor 110 relative to the stator 106.

Figures 1C, 1D:
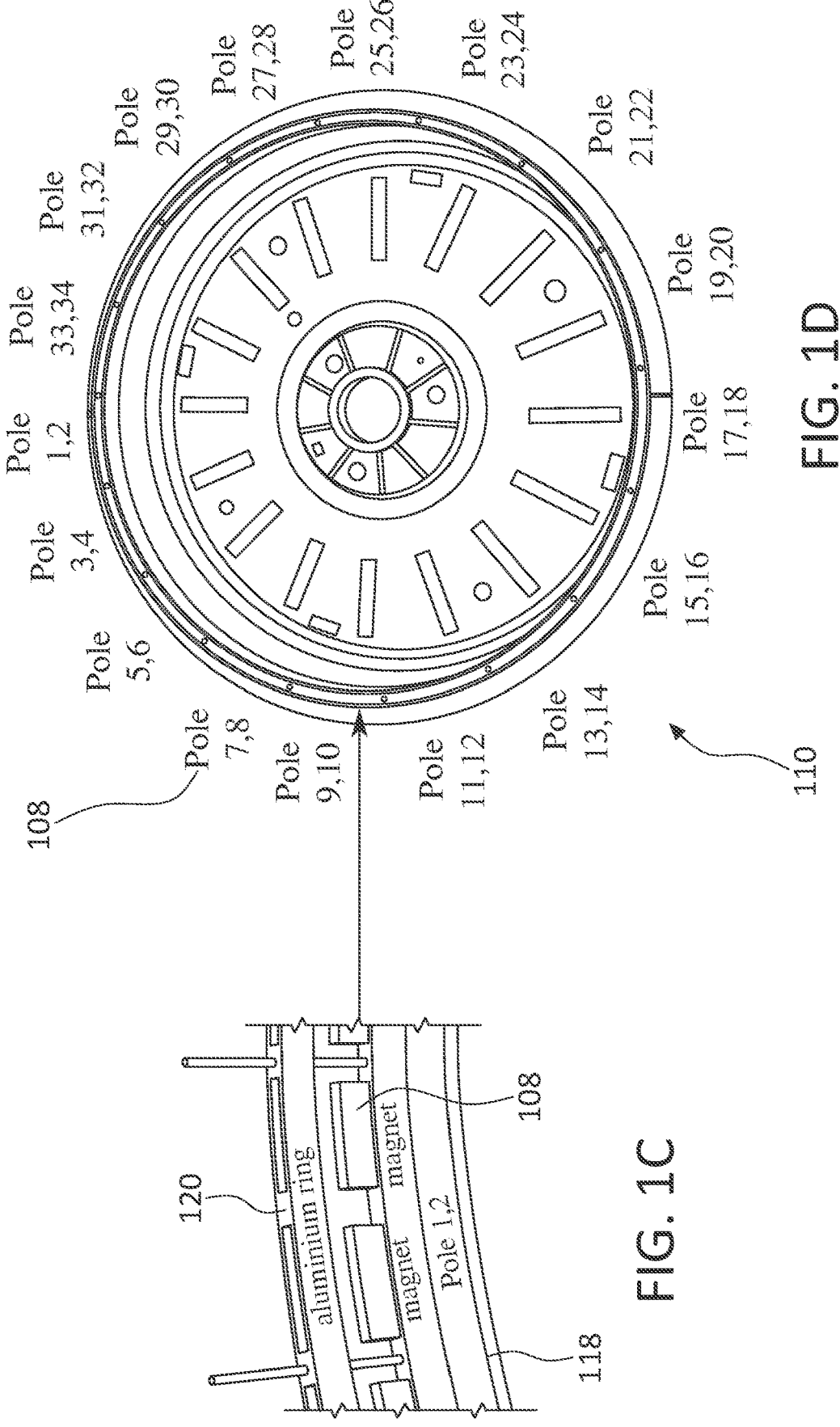
Figure 1E:
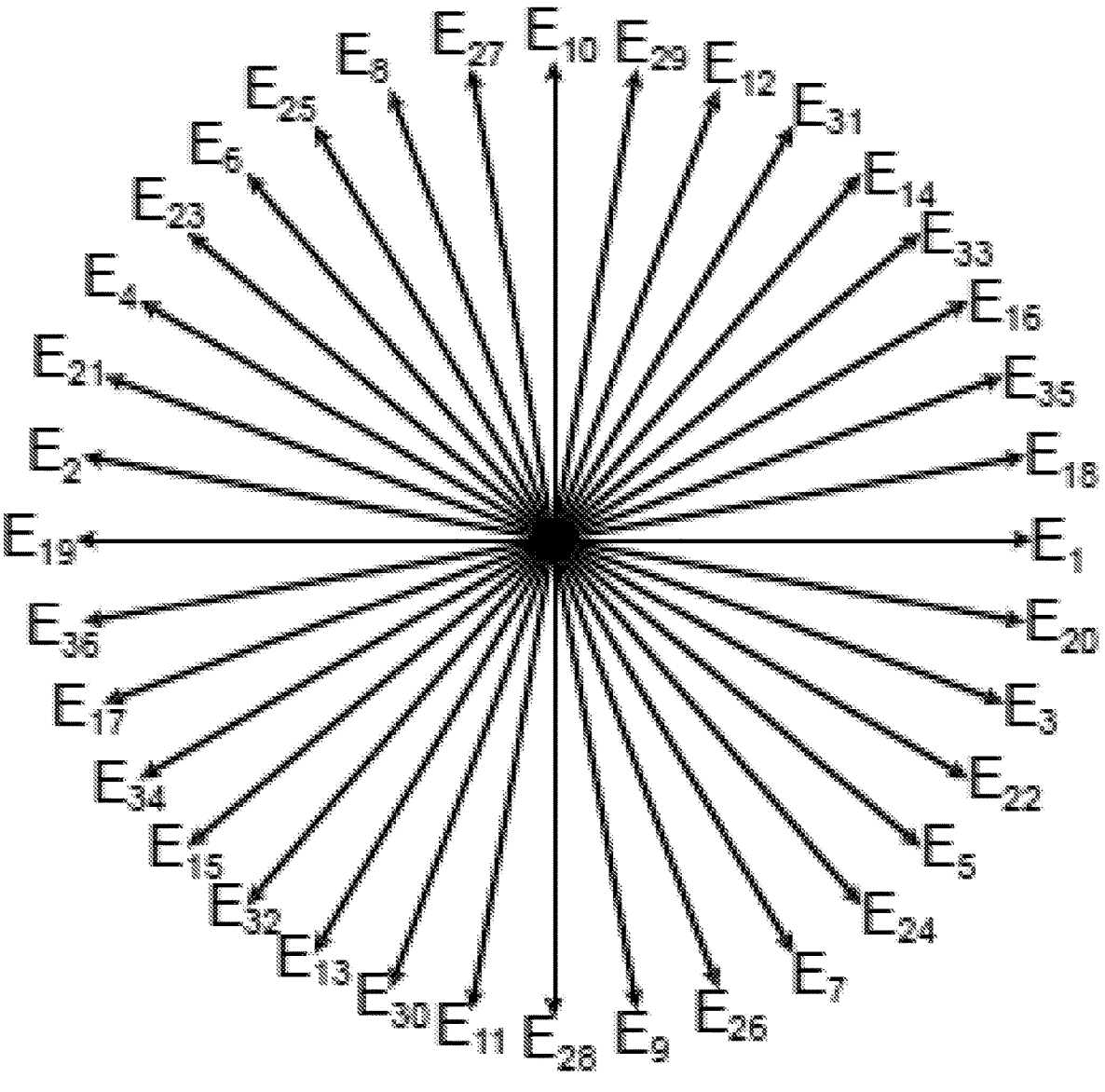

The experimental generator-rectifier 100 was assembled from modified Samsung DC96-01218D PM motors mounted on custom-built frames. The stator of the original motor had 36 coils, which were modified to be connected as described in the previous paragraph. The assembly that powers the passive rectifier needs to provide a set of back emfs, which requirement is met with the custom-built 34-pole rotor. 110. The magnets 108 are enclosed by retaining rings 118 and 120, as shown in FIG. 1C. The whole assembly is embedded concentrically inside the rotor 110 as shown in FIG. 1D Combined with the 36-coil stator, the modified machine has Lc/Lp=p/n=17/18, with n=36 and p=34. The phase difference between the back emfs of two consecutive coils is $$\pi \frac{L_c}{L_p}$$

or 170°. As the 170° phase difference between two consecutive coils repeats 36 times, the 360° interval is covered by vectors that are 10° apart, as illustrated in FIG. 1E. The coil connection pattern to form the required three three-phase sets with a 20° phase-shift is shown in FIG. 12F. Each phase is formed by serially connecting four coils, including out-of-phase pairs to eliminate mutual inductance. For example, phase $A_{P1}$ is formed by serially connecting coils 1 and 18 in the same polarity and coils 19 and 36 in the opposite polarity. As a result, the total back emf is $E_{AP1}=E_1+E_{18}-E_{19}-E_{36}$. Other phases are constructed in a similar manner.

Figure 1F:
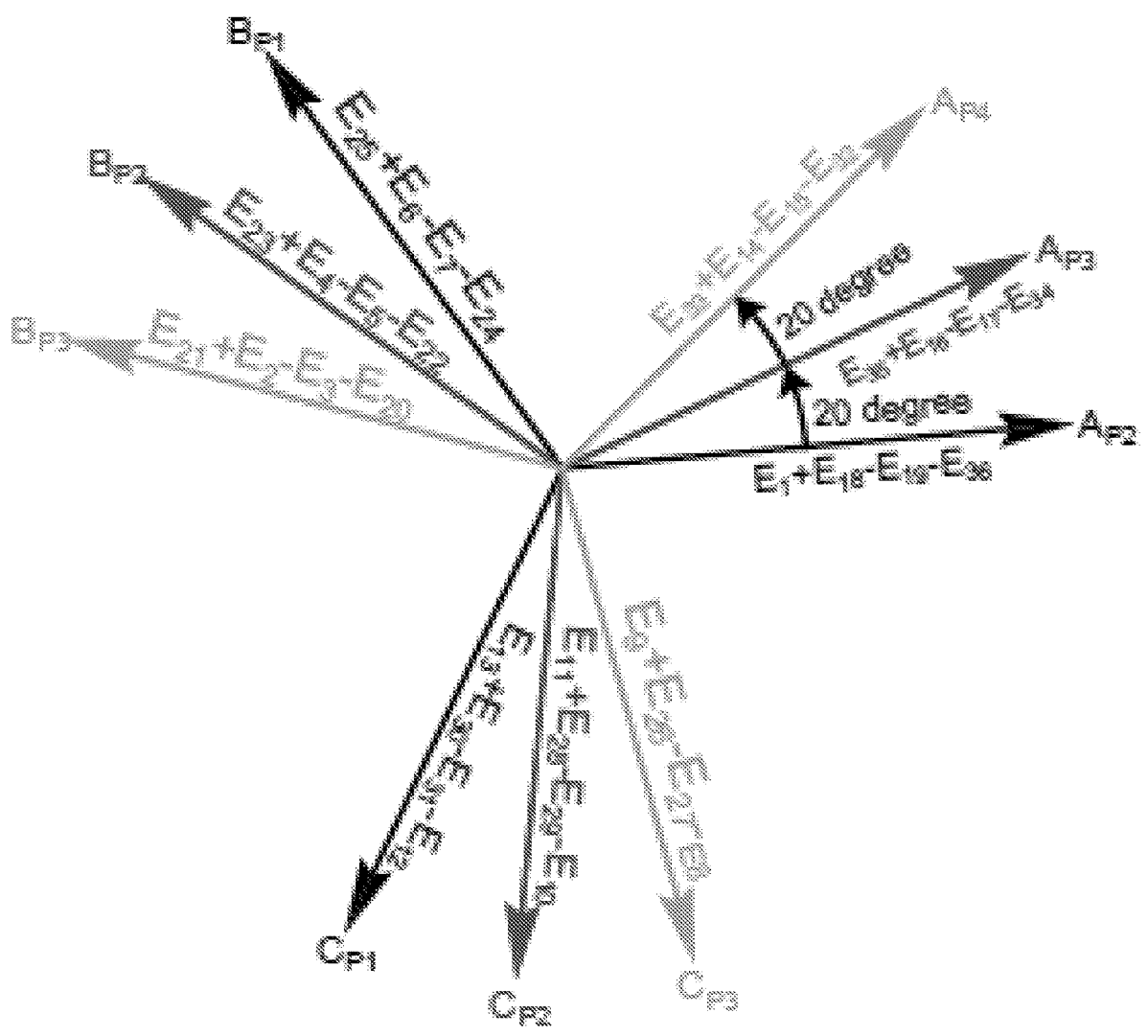
Figure 1G:
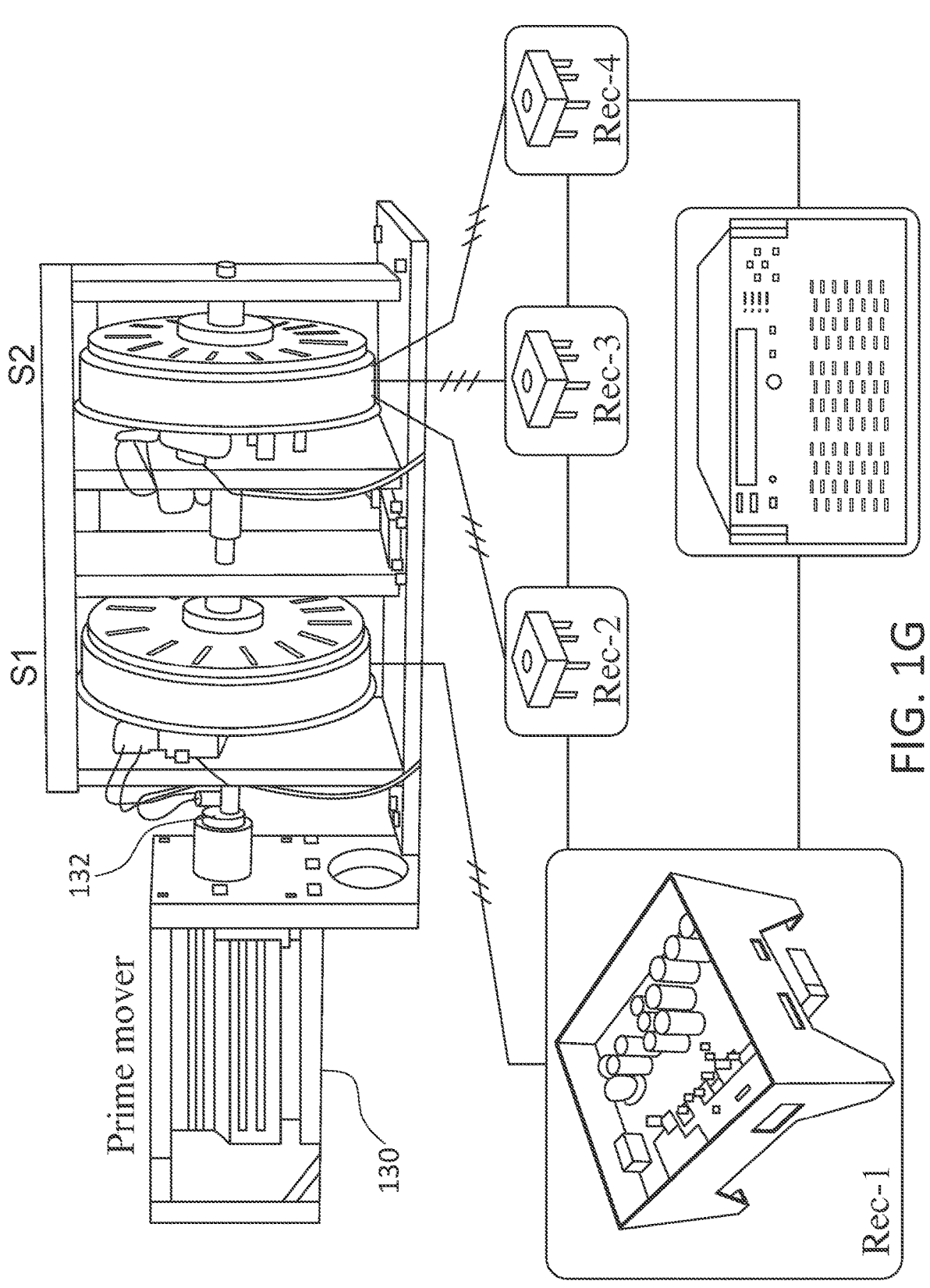

FIG. 1G shows the complete experimental setup. The generator includes two assemblies, S1 and S2. A prime mover 130 serves the role, for example, of a wind energy system to turn a shaft 132 that drives the two assemblies S1 and S2. S1 was a conventional machine with 48 magnetic poles powering the active rectifier Rec-1. S2 was an integrated generator-rectifier in accordance with FIGS. 1A-1F having 34 magnetic poles to form three phase-shifted AC ports. The three ports power three passive rectifiers, namely Rec-2, Rec-3, and Rec-4, which form the three-phase diode bridge. DC outputs of the passive and the active rectifiers were serially connected to deliver power to an electronics load operating in a constant-voltage mode.

Figure 2A:
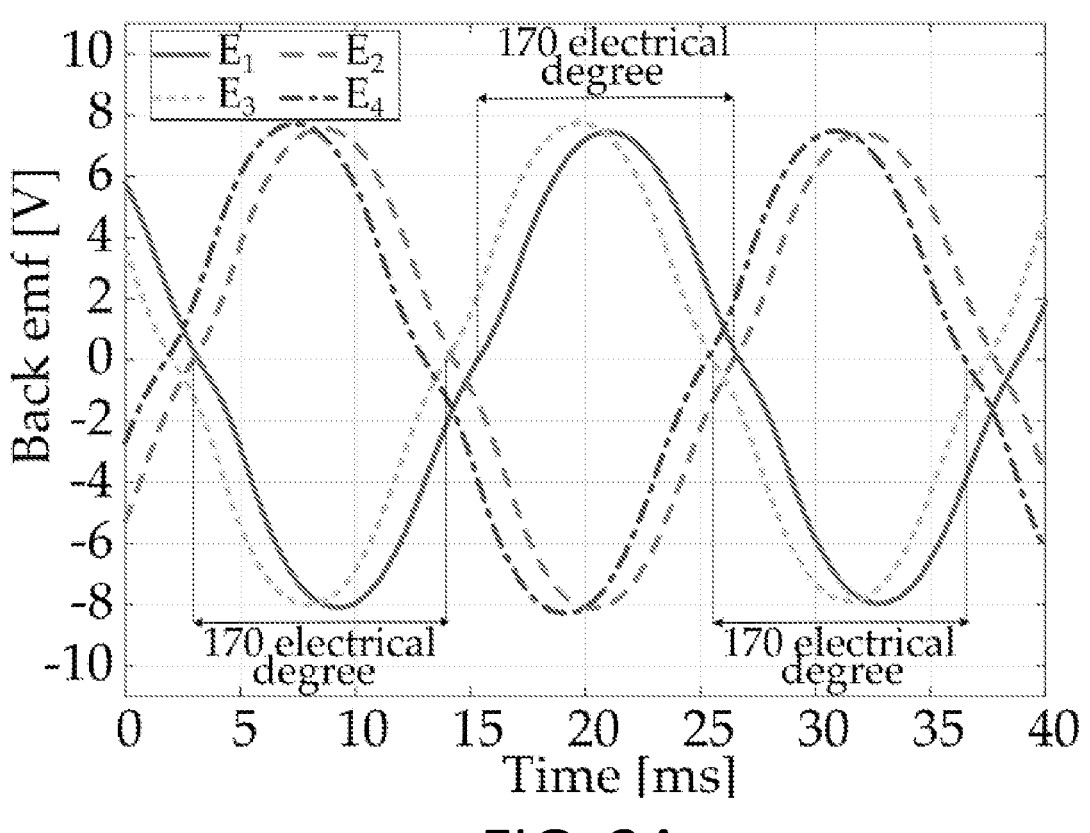
Figure 2B:
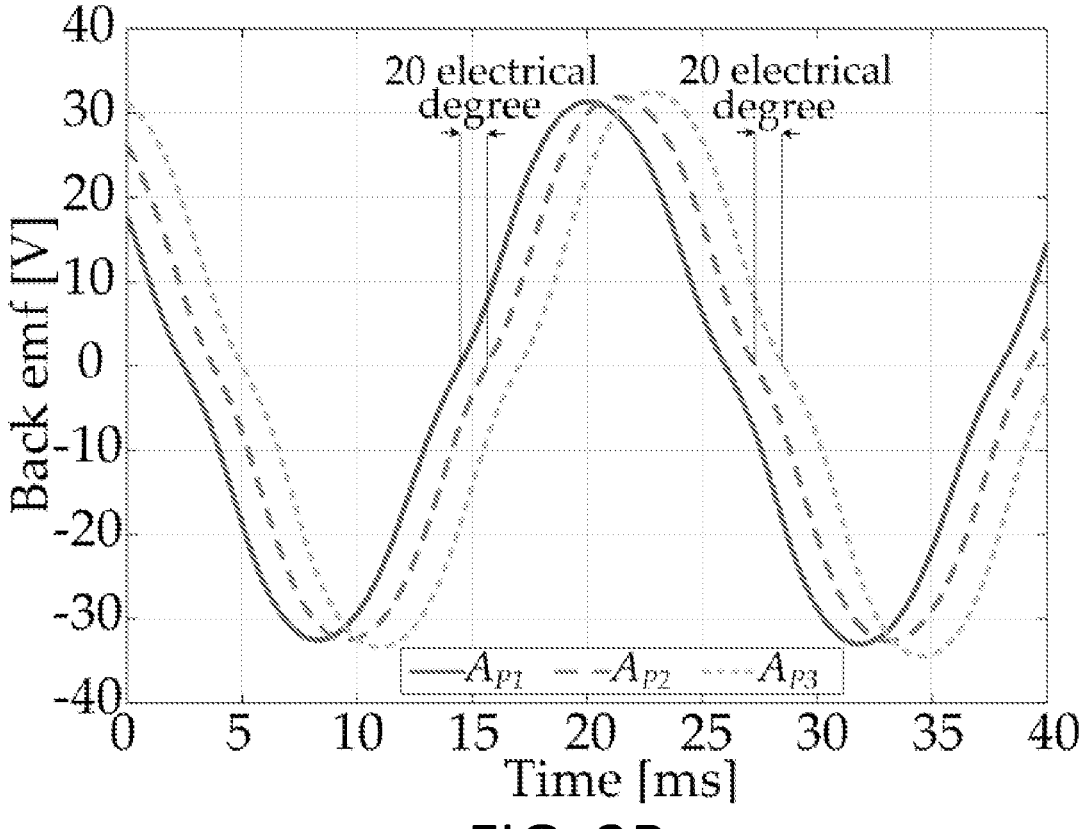
Figure 2C:
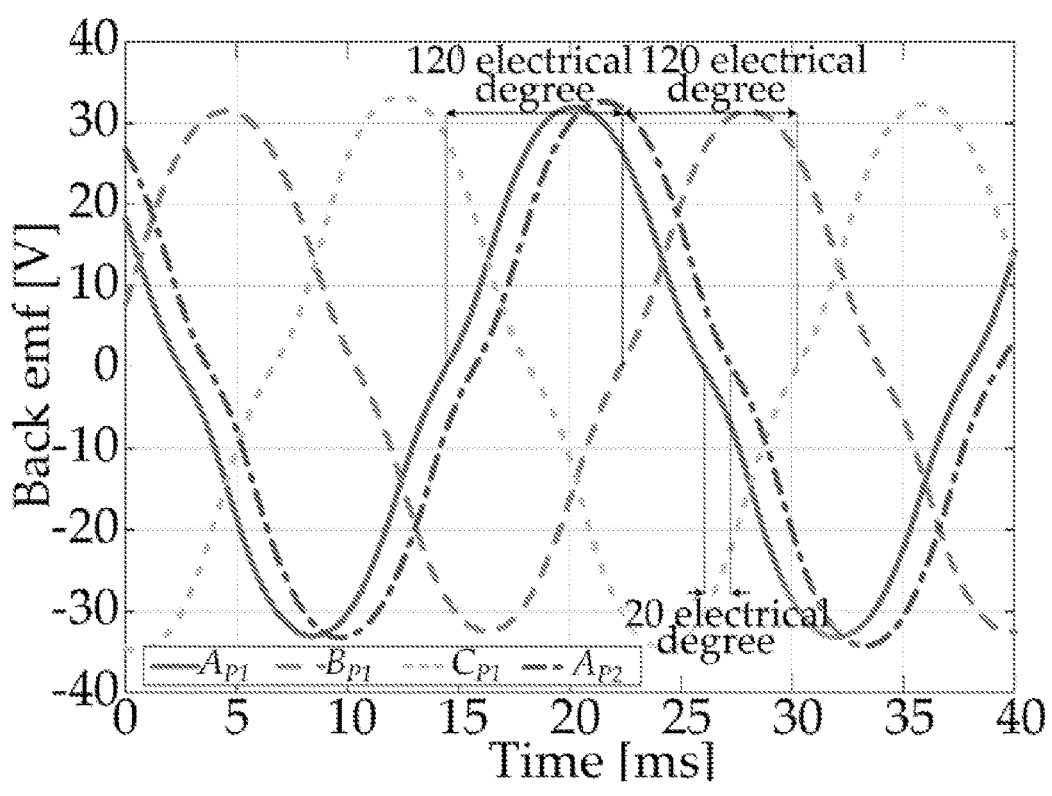
Figure 2D:
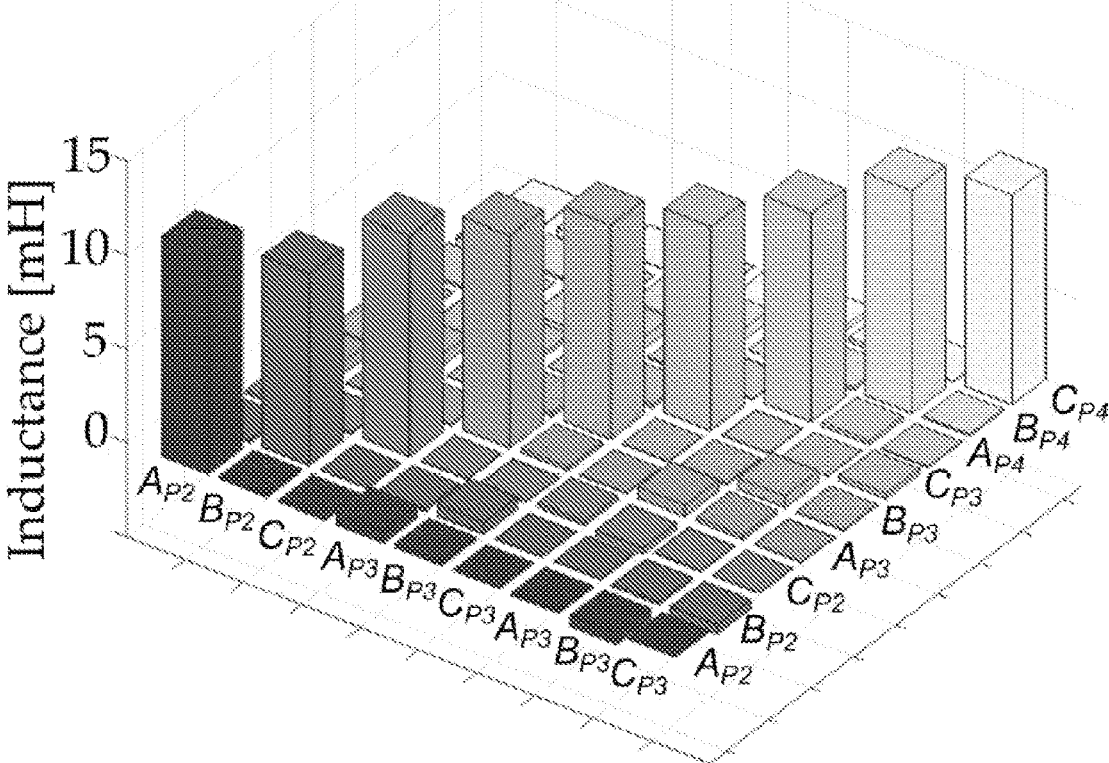

The experimentally measured back emfs of the modified machine verified the space vectors in FIG. 1F. The back emfs of individual coils 1, 2, 3, and 4 are shown FIG. 2A when the generator rotates at 150 rpm. Back emfs of two consecutive coils (e.g., 1 and 2, or 2 and 3, etc.) are phase-shifted by 170°. The connection pattern in FIG. 1F was implemented. Back emfs of phases $A_{P2}$, $A_{P3}$, $A_{P4}$ are recorded in FIG. 2B, showing a 20° phase shift between different AC ports. In addition, the back emfs of phases $A_{P2}$, $B_{P2}$, $C_{P2}$ in FIG. 2C show a 120° phase shift within the same AC port. The inductance matrix of assembly S2 has dominant diagonal elements as shown in FIG. 2D, which demonstrates that the integrated generator-rectifier can reduce the DC-bus voltage ripple without requiring bulky filter capacitors.

Figure 3A:
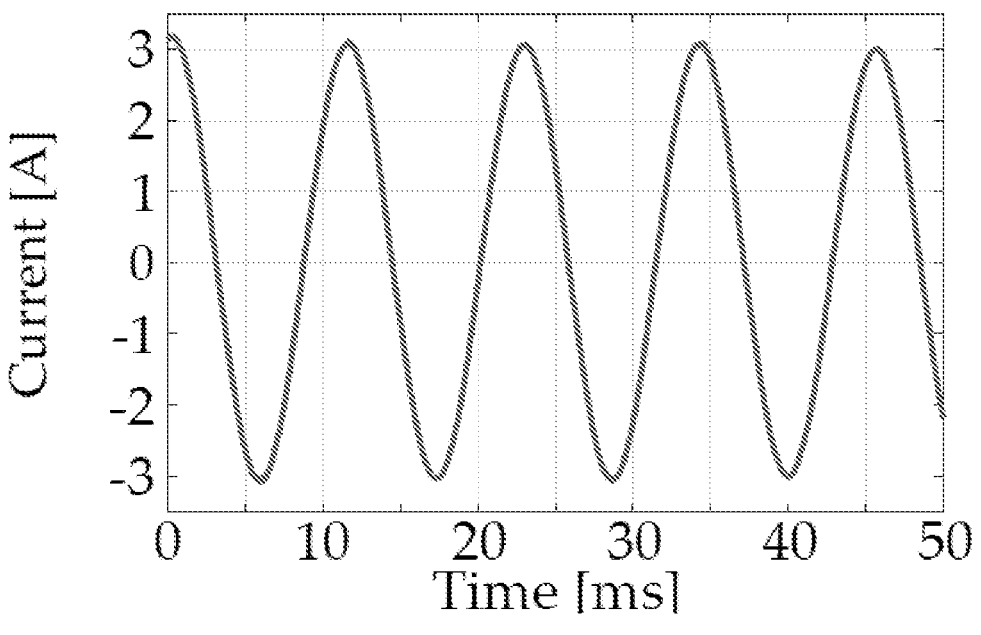
Figure 3B:
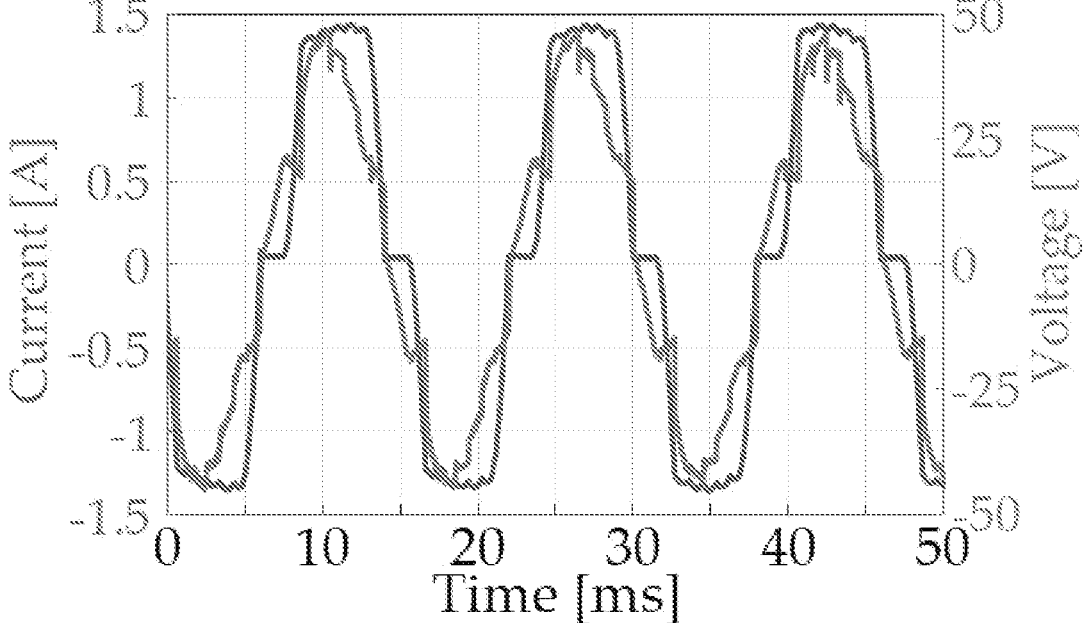

AC-DC conversion using the integrated generator-rectifier system of FIG. 1G is shown by the data in FIGS. 3A-3D. The outputs of the rectifiers are serially connected and deliver power to an electronics load operating in constant-voltage mode to maintain a 400-V DC-bus voltage. The prime mover turns the generator at 220 rpm. The active rectifier regulates sinusoidal current in the corresponding AC port and operates at unity power factor to minimize the volt-ampere rating. FIG. 3A shows the active rectifier phase-A current. DC-side current of the active-rectifier sets the current in the passive-rectifier AC ports. FIG. 2B shows the current and voltage (relative to the neutral point) of port-2 phase-A. The current is trapezoidal because of the diode-bridge operation and closely mimics the simulation results in FIG. 3A. The voltage and current are in phase due to elimination of the DC-side filter capacitor. The calculated power factor is 0.94, mostly due to the distortion factor.

Figure 3C:
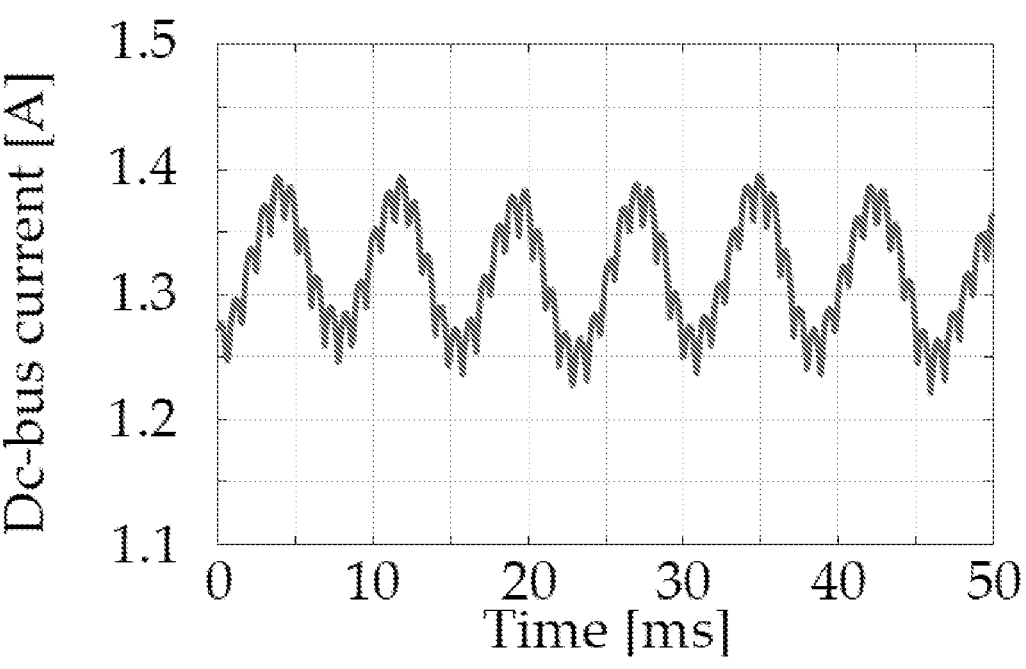
Figure 3D:
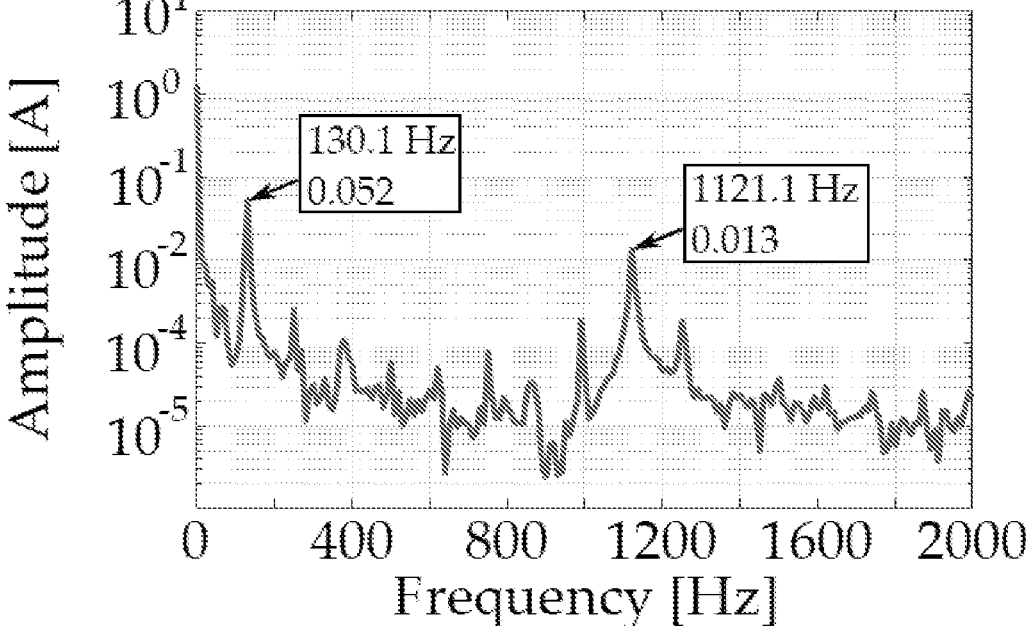

Although the filter capacitors are eliminated, the DC-bus current has a low ripple component due to the phase shift between different passive rectifier AC ports, as shown in FIG. 3C. There are two observable ripple components, one at 130 Hz and another one at 1121 Hz-18 times the line frequency, as shown in FIG. 3D. The first is due to the generator imperfections, as shown by slight imbalance between back emfs, while the second component is due to the back-emf phase shifting. A more careful or commercial manufacture of the machine would eliminate the first factor, resulting in a lower DC-bus power ripple. The total DC-bus current peak-to-peak ripple is 12.8% of the average value. A total power of 527 W is delivered to the electronic load.

Figure 4:
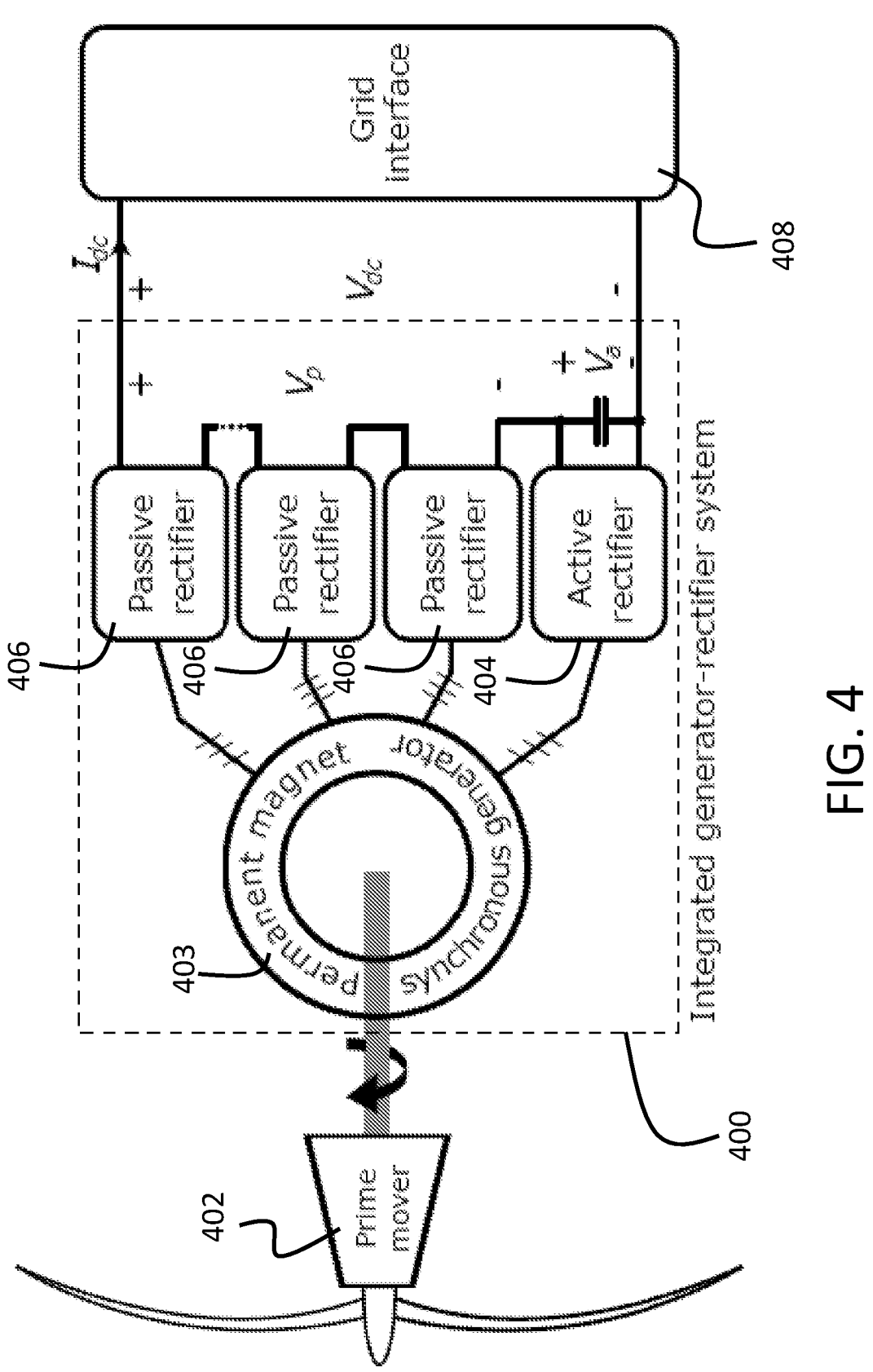
FIG. 4 is a schematic diagram of a wind energy system that including an integrated generator-rectifier of the invention.

FIG. 4 shows an integrated generator-rectifier series-stack architecture 400 driven by a wind energy device 402 as the prime mover of an integrated generator-rectifier 403, which reduces the amount of power processed by an active rectifier 404 by extensively using passive diodes 406 operating at the generator line frequency. The passive rectifiers 406 process 60% of the total power while the active rectifier 404 regulates the power flow to achieve the turbine maximum power point tracking (MPPT) creating an efficient energy transfer to an electrical grid via a grid interface 408. The reduction in active rectification along with the elimination of passive-rectifier bulky filter capacitors by phase-shifting the generator back electro-motive-forces (emfs) improve the overall system power density, efficiency, and reliability.

Rather than considering the multi-port generator as isolated AC ports modeled using a series resistance, inductance, and a speed-dependent voltage source (RLE), which is a complex analysis, the invention includes an analytical framework to guide design and capture the interaction between different generator AC ports and the rectifiers by considering the complete generator inductance matrix, capturing all self and mutual inductances. Requirements on the inductance matrix are derived to ensure the isolated-RLE model's validity from a design and control perspective, even in the presence of magnetic coupling among different AC ports. The analysis reveals a trade-off between the DC bus power ripple and the power imbalance between the active and passive sections of the generator. The fractional-pole-pitch winding layout is a preferred example embodiment that can provide a 20° phase shift among the passive ports, while achieving a complete magnetic decoupling from an equivalent circuit standpoint. The desired properties are verified using a generator finite-element-analysis (FEA) model at a 10-MW power level. A simulation coupling the FEA model to the rectifier circuit proves that a low DC-bus power ripple and a low generator torque are simultaneously achieved. The experimental fractional-pole-pitch structure of FIG. 1G was implemented at a low power level as a physical demonstration. The analysis paves the way for development of other multi-port machine topologies that are guaranteed to work with the present integrated rectifier system.

Figure 5:
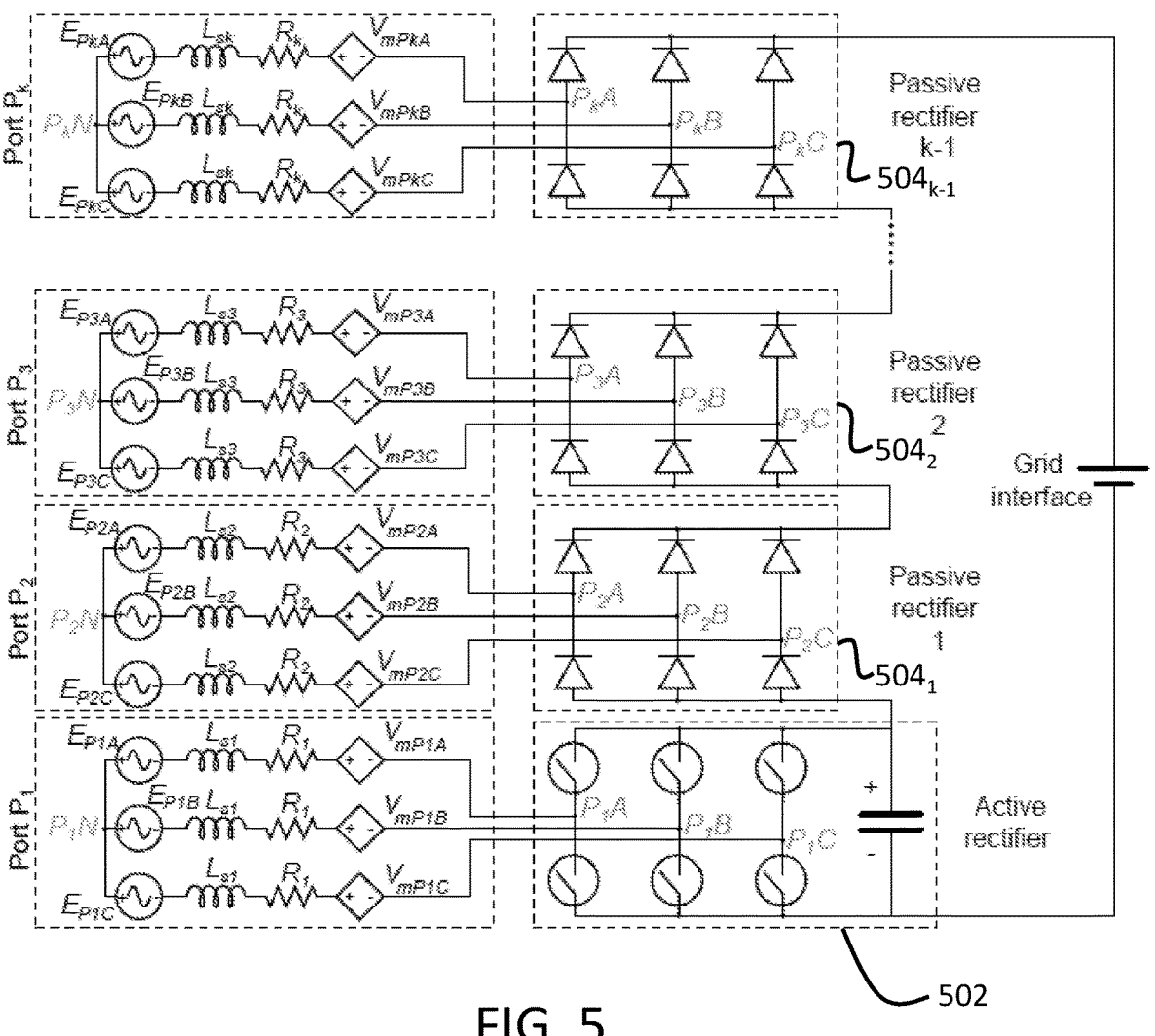
FIG. 5 is an electrical circuit representation of the integrated generator-rectifier system of FIG. 4.

FIG. 5 presents a generalized circuit representation of the integrated generator-rectifier system considering the magnetic coupling across all the generator phases. Conditions for the magnetic decoupling are derived assuming that the neutral points of all the AC ports are electrically isolated. Under these constraints, the active rectifier can be controlled as a DC current source and the passive-rectifier AC ports are representable using RLE equivalent circuits. A per-unit circuit is then constructed to evaluate the DC-bus power ripple and the output-power imbalance between one passive and the active ports. Finally, a trade-off is established between these two quantities. This trade-off curve can be used as an additional input to the generator design to achieve a specific DC-bus power ripple and output power ratio between the active and passive ports.

The FIG. 5 circuit representation is based on a k-port generator with the magnetic coupling represented using current-dependent voltage sources. Port $P_1$ powers an active rectifier 502 that includes six active switches and an output capacitor, and the others are each connected to a three-phase passive rectifier $504_1$, $504_2$, $504_{k-1}$ without an output capacitor. This capacitor can be realized with a film and/or electrolytic capacitors. The passive rectifiers do not need output capacitors, which is very advantageous from an implementation standpoint. The inputs to the rectifier (both active and passive), the three-phase winding sets, are isolated, neither serial nor parallel. Each phase in an AC port is modeled by a speed-dependent back emf source, a self-inductance, a resistance, and the current-dependent voltage source, all connected in series. In general, the phase-A back emf of port $ZP_i$ is $$E_{PiA} = E_i \sin(\omega t + \theta_i) \qquad (1)$$

where $E_i$ is the amplitude, $\omega$ is the electrical frequency, and $\Theta_i$ the relative phase shift between port $P_i$ and port $P_2$. The phase-B and phase-C back emfs of each port lag the phase-A back emf by $2\pi/3$ and $4\pi/3$, respectively. An appropriate $\Theta_i$ among different passive ports reduces the total passive-port voltage ripple, thereby, eliminating the need for bulky DC-side filter capacitors to smooth the output power.

The current-dependent voltage source in each phase captures the induced voltage on the phase due to current variation in all the other phases, including the one from different AC ports. For example, the induced voltage on port $P_i$ phase-A is:

$$V_{mPiA} = \underbrace{L_{PiA,PiB}\frac{dI_{PiB}}{dt} + L_{PiA,PiC}\frac{dI_{PiC}}{dt}}_{V'} + \underbrace{\sum_{j=1 \dots k\ j \neq i, X \in \{A,B,C\}} L_{PiA,PjX}\frac{dI_{PjX}}{dt}}_{V''} \qquad (2)$$

where j indexes all other ports, $L_{PiA,PjX}$ represents the mutual inductance between phase A of the $P_i$ port and phase X of the $P_{ji}$ port (X could be either A, B, or C), and $I_{PjA}$ denotes the phase-A current in port $P_j$.

From a circuit standpoint, the phases are decoupled if the current-dependent voltage source in one phase is representable only as a function of the current in the same phase. Evident from (2), the voltage comprises two components, one due to different phases within the same AC port, and the other from the different AC ports. The currents in each port are always balanced due to the neutral point isolation, e.g., $I_{PiA} + I_{PiB} + I_{PiC} = 0$, $\forall i = 1 \dots k$. Dependency of V' on other phase currents is eliminated by keeping the mutual inductances between any two phases within the same AC port equal, e.g., $L_{PiA,PjA} = L_{PiA,PiC}$. V'' is eliminated by ensuring identical mutual inductances between any two AC ports, e.g., $L_{PiA,PjA} = L_{PiA,PjB} = L_{PiA,PjC}$. With these conditions, (2) reduces to $$V_{mPiA} = -M_i\frac{dI_{PiA}}{dt} \qquad (3)$$

where $M_i$ is the mutual inductance between any two phases of port $P_i$. Therefore, the per-phase voltage between nodes $P_iN$ and $P_iA$ in FIG. 5 becomes $$V_{PiN,PiA} = E_{PiA} + L_i\frac{dI_{PiA}}{dt} + R_iI_{PiA} \qquad (4)$$

where $L_i = L_{si} - M_i$ represents the equivalent inductance with $L_{si}$ being the self-inductance of the $P_i$ port. This voltage equation represents an RLE model for phase-A of port $P_i$.

The magnetic decoupling can be achieved for all the other phases if the inductance matrix follows the form in Table 1, which is shown in FIG. 6. The form in Table 1 shows that coupling among phases within one port follows a diagonal matrix with identical off-diagonal terms and identical diagonal terms. However, the off-diagonal terms and diagonal terms do not have to be the same. The mutual coupling between two different ports requires all elements of the mutual inductance sub-matrix being identical. Under this condition, the integrated generator-rectifier system is representable by the simplified circuit in FIG. 7. The active rectifier can draw constant power because the equivalent inductances and resistances of all the phases are identical. Therefore, it is represented by an ideal current source in parallel with a capacitor. In addition, all the mutual voltages are eliminated. Parameters for the circuit are derived next.

A per-unit equivalent representation eliminates the need for actual voltage and actual power for circuit analysis. This circuit representation is useful because the generator per-unit reactance is terminal-voltage and output-power independent. The generator stack length and number of turns can be scaled to meet the power and voltage levels without affecting the rectifier system features, such as the power percentage processed by the active rectifier, the power imbalance between the AC ports, and the DC-bus power ripple percentage.

The first step to develop the circuit is to define the base quantities. The base voltage is defined as $$V_{base} = \sum_{i=1\ldots k} \frac{E_i \sqrt{3}}{\sqrt{2}}, \text{ and } P_{base} = P_{rated} \tag{5}$$

where $E_i$ is the line-to-neutral peak back emf of port $P_k$ and $P_{rated}$ is the rated output power. The derived base current and impedance are $$I_{base} = \frac{P_{base}}{\sqrt{3}\, V_{base}}, \text{ and } Z_{base} = \frac{V_{base}}{\sqrt{3}\, I_{base}}. \tag{6}$$

The second step is to normalize the actual equations by the base values. For example, normalizing both sides of (4) by the defined $V_{base}$, normalizing current terms by the defined $I_{base}$ and factoring out the base impedance, the per-unit representation is $$V_{PkN,PkA}^{pu} = E_{PkA}^{pu} + \frac{L_k^{pu}}{\sqrt{3}} \frac{dI_{PkA}^{pu}}{dt} + \frac{R_k^{pu}}{\sqrt{3}} I_{PkA}^{pu} \tag{7}$$

Figure 7:
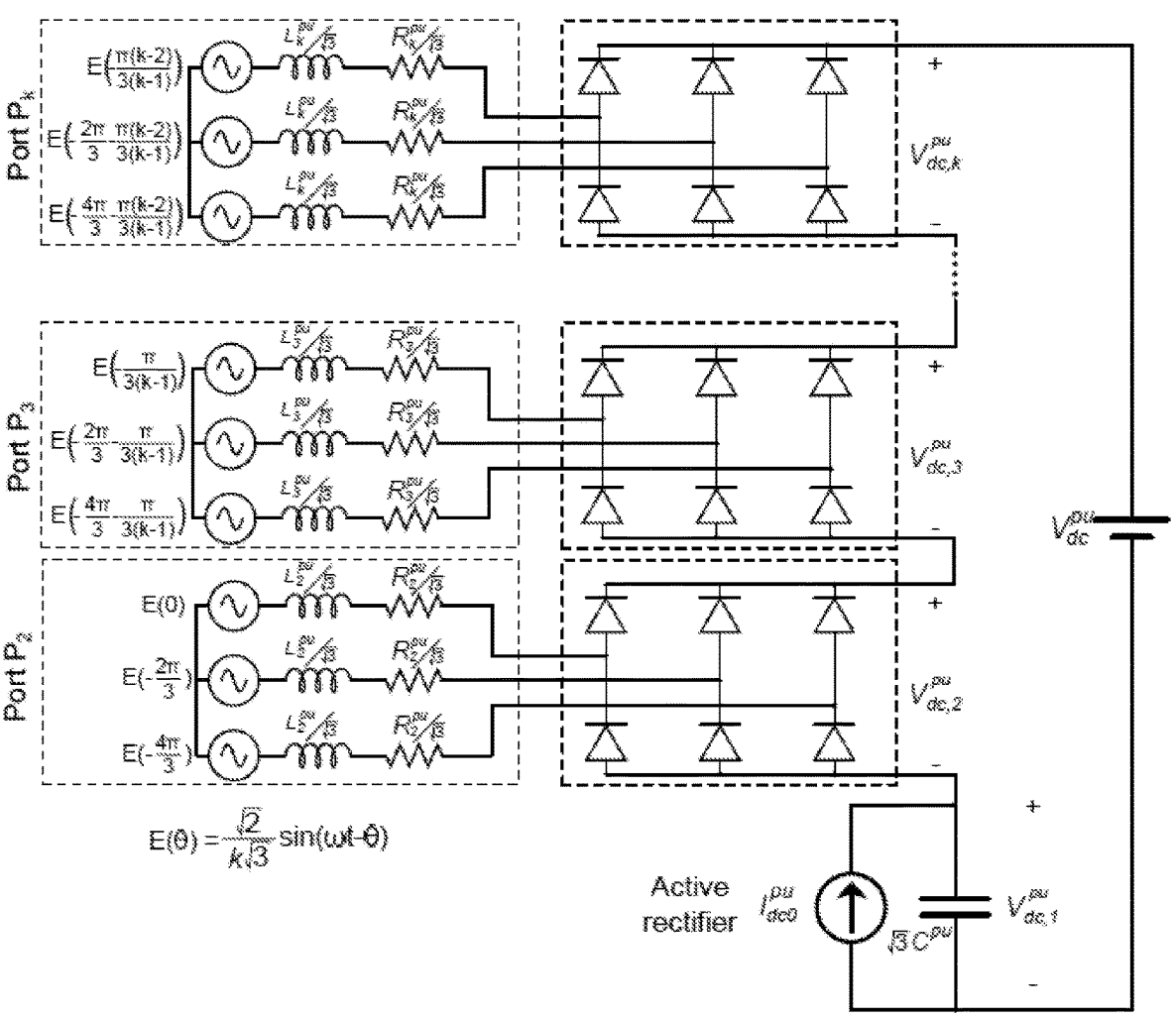
FIG. 7 is a simplified equivalent circuit of the integrated generator-rectifier system considering the control strategy, and parameters are expressed on a per-unit basis.

The same normalization is applied for all other RLE branches from FIG. 7. The development is completed with the capacitor equation:

$$I_C = C \frac{dV_C}{dt} \tag{8}$$

where C is the capacitance of the high-frequency filter capacitor. Normalizing both sides of (8) by $I_{base}$ and $V_C$ by $V_{base}$, as well as collecting the terms using $Z_{base}$:

$$I_C^{pu} = \frac{\sqrt{3}\,C}{Z_{base}} \frac{dV_C^{pu}}{dt} = \sqrt{3}\, C^{pu} \frac{dV_C^{pu}}{dt}. \tag{9}$$

The per-unit equation is identical to the original equation, except that the factor $1/\sqrt{3}$ appears with each per-unit inductance and resistance term, and the factor $\sqrt{3}$ appears with the per-unit capacitance term, as shown in FIG. 7. The back emfs of all phases are assumed to be identical. Therefore, each has the normalized amplitude of $$\frac{\sqrt{2}}{k\sqrt{3}}$$

with the appropriate phase angle.

The FIG. 7 circuit representation captures both power ripple on the DC-bus and the amount of power delivered by each AC port. Quantification of these values requires the active-rectifier DC-output current $I_{dc}^{pu}$ and the per-unit DC bus $V_{DC}^{pu} V_{base} I_{DC}^{pu} I_{base}$. By definition (6), the product between the per-unit DC-bus voltage and the per-unit active-rectifier DC-side current is constant:

$$V_{dc,i}^{pu} \Big|_{i=2\ldots k} = \underbrace{\frac{3}{\pi} \frac{\sqrt{2}}{k}}_{back\ emf\ contribution} - \underbrace{\frac{3}{\pi} \frac{\omega L_i^{pu}}{\sqrt{3}} I_{dc0}^{pu}}_{commutation\ drop} - \underbrace{2\frac{R_i^{pu}}{\sqrt{3}} I_{dc0}^{pu}}_{resistive\ drop}. \tag{11}$$

where $\omega$ is the rated electrical frequency. The active-rectifier DC-side voltage must be the peak line-to-line back emf to maintain controllability under the space-vector-modulation scheme while minimizing the voltage rating, or $$V_{dc,1}^{pu} = \frac{\sqrt{2}}{k}. \tag{12}$$

By KVL (Kirchoff s Voltage Law), the DC-bus voltage is:

$$V_{dc}^{pu} = \sum_{i=1\ldots k} V_{dc,i}^{pu}. \tag{13}$$

Substituting (11) and (12) into (13) as well as using (10), the per-unit DC-bus voltage follows:

$$V_{dc}^{pu} = \frac{\sqrt{2}}{k} + \frac{3}{\pi} \frac{\sqrt{2}}{k} (k-1) - \sum_{i=2\ldots k} \left( \frac{3}{\pi} \frac{X_{Li}^{pu}}{V_{dc}^{pu}} + 2\frac{R_i^{pu}}{V_{dc}^{pu}} \right) \tag{14}$$

Where $X_{Li}^{pu} = \omega L_i^{pu}$ represents the per-unit equivalent reactance of each phase in port i. The per-unit DC-bus voltage is calculated by solving the quadratic equation (14). The DC-bus average current is calculated using (10) to complete the parameters in FIG. 7.

Figure 8:
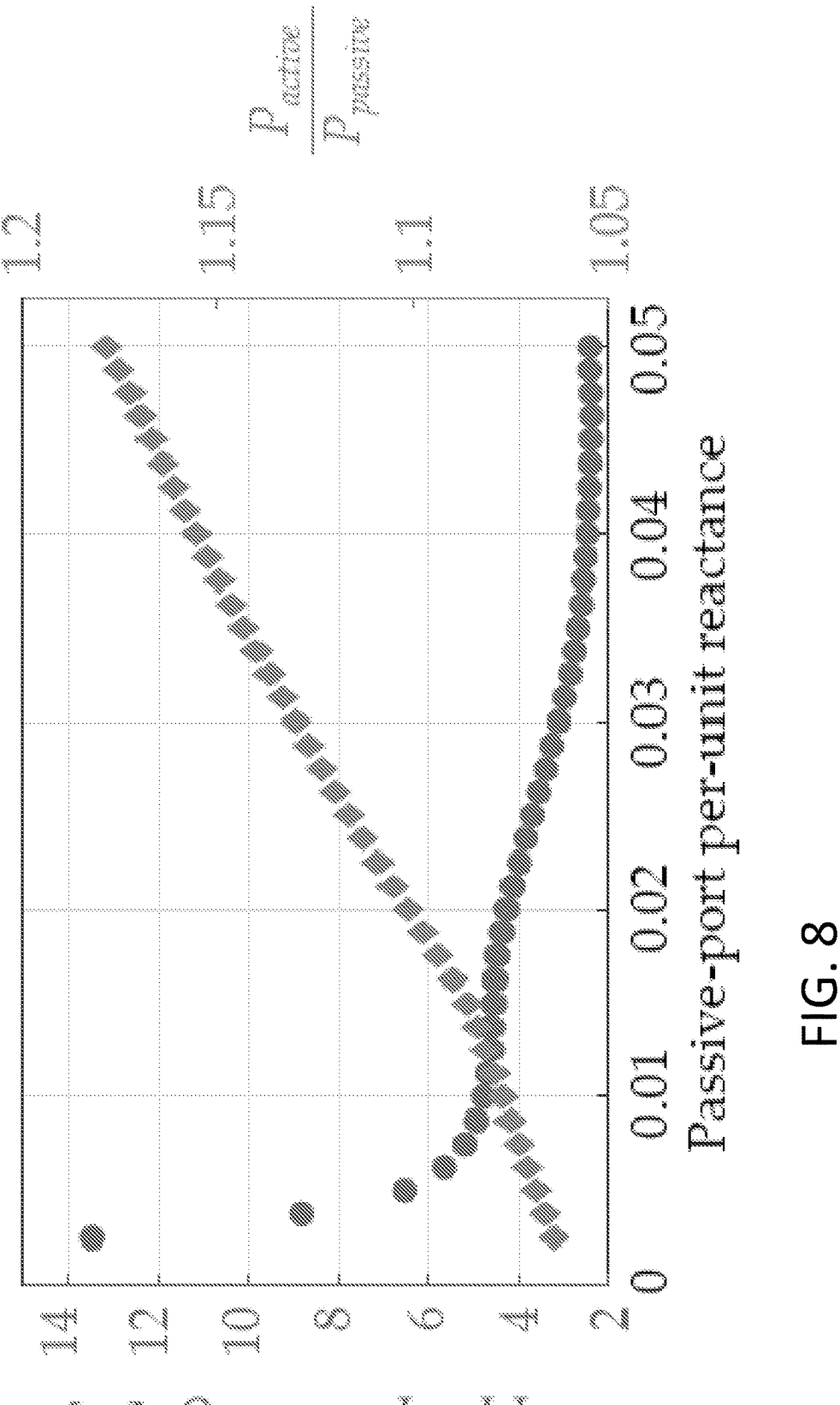
FIG. 8 is a plot of DC-bus power versus passive port per unit reactance for a 4-port generator with $R_i^{pu}$=0.011, and $C^{pu}$=0.01; DC-bus power ripple decreases as the per-port per-unit reactance increases and the active rectifier delivers more power compared to the passive rectifier.

FIG. 8 shows the DC-bus power ripple and the output power ratio between one passive port and the active port as a function of $X_{Li}^{pu}$ sing the per-unit circuit of FIG. 7. The results are generated assuming a four-identical-AC-port machine with K=4, $R_i^{pu}$=0.011, and $C^{pu}$=0.01. As the per-unit reactance increases, the DC-bus power ripple decreases because the rate of current commutation in the AC port is reduced. In addition, less power is delivered through the passive rectifier because the output DC-bus voltage is reduced as the inductance increases, as shown in (11). Therefore, the ratio between the output power of the active port and that of the passive port increases.

The integrated generator-rectifier system has particular beneficial application to a limited-speed-range operation in a wind-turbine application. A comparison against the conventional alternatives can quantify these advantages. The generator's back emf amplitude is linearly dependent on the generator speed. As a result, the DC-side voltage of each passive rectifier is $$V_{dc,i}^{pu}(\omega^{pu}) = \underbrace{\frac{3}{\pi} \frac{\sqrt{2}}{k} \omega^{pu}}_{back\ emf\ contribution} \Big|_{i=2\ldots k} - \underbrace{\frac{3}{\pi} \frac{\omega \omega^{pu} L_i^{pu}}{\sqrt{3}} (\omega^{pu})^3 I_{dc0}^{pu}}_{commutation\ drop} - \underbrace{2\frac{R_i^{pu}}{\sqrt{3}} (\omega^{pu})^3 I_{dc0}^{pu}}_{resistive\ drop} \tag{15}$$

Where $\omega^{pu}$ is the per-unit generator speed. The term $\omega\omega^{pu}L_i^{pu}$ relates the inductance to the speed. In addition, $(\omega^{pu})^3I_{DC0}^{pu}$ represents output power of a wind turbine at maximum power, which is proportional to the cube of the rotational speed in a wind-turbine application. Even though the generator operates at variable speed, the DC-bus voltage as calculated by (14) is maintained constant across the entire operating speed range by a grid-side converter. The difference between the DC-bus voltage and the total passive-rectifier output is the active-rectifier DC-side voltage, which is speed dependent:

$$V_{dc,1}^{pu}(\omega^{pu}) = V_{dc}^{pu} - \sum_{i=2..k} V_{dc,i}^{pu}(\omega^{pu}).\tag{16}$$

FIG. 9A shows the DC-side voltage of the active rectifier by the blue-dash line for a four-port integrated generator-rectifier system with $X_{Li}^{pu}=0.025$ and the phase resistance neglected. The maximum DC-side voltage happens at the minimum generator speed, which sets the active-rectifier's rated voltage to be 0.75 pu. In a conventional one-port system, the active-rectifier rated voltage is $\sqrt{2}$pu using (14).

The maximum current in an active-rectifier happens on the AC-side. The peak AC-side current is determined by the power balance relationship between the AC and DC sides:

$$\frac{3}{2}E_1^{pu}(\omega^{pu})I_{d,1}^{pu}(\omega^{pu}) = V_{dc,1}^{pu}(\omega^{pu}) \times (\omega^{pu})^3 I_{dc0}^{pu}\tag{17}$$

where $E_1^{pu}$ is the per-unit peak line-neutral back emf of the AC port powering the active rectifier. $I_{d,1}^{pu}$ is the d-axis current of the active-rectifier AC-side currents with the d-axis aligned with the phase-A back emf. This d-axis current is the same as the peak AC-side current when the unity power-factor current-control strategy is implemented. The d-axis current is regulated by a controller such that the DC-bus current delivers a power that is proportional to the cube of the generator rotational speed. FIG. 9A shows the peak AC-side current of the active rectifier for the four-port integrated generator-rectifier system.

The curves for the active-rectifier's voltage and current requirements could be constructed using (16) and (17) for each number of AC ports and a given per-unit reactance. Subsequently, the volt-ampere (VA) rating is calculated as the product between the maximum required voltage and current. The VA rating indicates the active-rectifier size. FIG. 9B shows the VA ratings as a function of the number of AC ports for a system with a total per-unit reactance of 0.1 pu, which equally splits among different ports. An integrated system based on a four-port generator results in the minimum VA rating—1.19 pu compared to 2 pu of a conventional system, equivalent to a 40% reduction. As the majority of the power is processed on highly-efficient diodes, the overall conversion losses are significantly reduced, as shown in FIG. 9C. At the rated condition, the losses are reduced by 60%, from 3% to 1%.

Table II compares the integrated generator-rectifier system and other alternatives for high-power AC-to-DC conversion.

TABLE II

COMPARISONS OF DIFFERENT ARCHITECTURES FOR HIGH POWER AC-TO-DC CONVERSION [14]

| | Integrated generator-rectifier | Six-pulse diode rectifier | Two-level converter | Neutral-point clamped converter |
|---|---|---|---|---|
| Number of active switches | 6 | 0 | 6 | 12 |
| Active switch voltage rating | $<0.4\ V_{dc}$ | — | $V_{dc}$ | $0.5\ V_{dc}$ |
| Power processed on active switches | $<30\%\ P_{dc}$ | 0 | $P_{dc}$ | $P_{dc}$ |
| Conversion loss | $<1\%$ | 0.3% | 3.2% | 3% [20] |
| Dc-bus control | Yes | No | Yes | Yes |

From the power electronics perspective, diode bridge is the most simple, reliable, and efficient but without control capability. The two-level pulse-width modulation (PWM) and three-level neutral-point-clamped (NPC) converters are the most common alternatives. The first choice requires the switch to be rated for the entire DC-bus voltage and the peak AC-side current. Parallel- and series-connecting multiple devices are typically required to reach MW-power level due to device's limited available voltage and current ratings. Consequently, the reliability is compromised because complex circuit board layout and additional circuitry are required to ensure even voltage/current sharing. NPC converters reduces the individual switch voltage or current rating but potentially leads to pre-mature failure at the hot spots due to uneven loss distribution. From a machine standpoint, multi-port generators have been used to connect several active rectifiers in parallel, thereby reducing each individual active-rectifier size. However, in this architecture, the entire power must be processed by active-switching devices. In comparison, the present integrated generator-rectifier system processes the majority of the power using diodes, leading to its high power density, efficiency, and reliability.

A winding layout that meets the inductance matrix requirement in Table I for a four-port generator is represented in FIG. 10A, realized by two structures 1002 and 1004 that are axially split. The left section P1 creates one AC port powering the active rectifier. The right section creates three AC ports P2-P4, 20° phase-shifted from each other to minimize the DC-bus power ripple, powering three passive rectifiers. The axial split eliminates the mutual inductance between the active-rectifier AC port and passive-rectifier AC ports. Mutual inductances among the passive-rectifier AC ports are eliminated by designing a winding layout based on fractional-pole-pitch coils. FIG. 10B shows voltage vectors of the active-rectifier port P1, and FIG. 10C shows voltage vectors of the passive ports P2-P4.

Non-overlapping fractional-pole-pitch coils are selected to achieve multiple passive-rectifier AC ports with appropriate phase shift and zero mutual inductance. The top view of the coil structure is shown in FIG. 11 with X denoting the going and X' denotes the returning coil side. Assuming the back emf on the coil $X_1X_1'$ is $$E_{X_1X_1'}=E_0\cos(\omega t),\tag{18}$$

where $E_0$ is the amplitude and $\omega$ is the electrical frequency. The coil pitch, distance between two adjacent coil centers, is denoted by $L_C$ and the pole pitch is denoted by $L_P$. The back emf of the k-th coil is:

$$E_{X_k X'_k} = E_0 \cos\left(\omega t - \pi(k-1)\frac{L_c}{L_p}\right) \quad (19)$$

where coil 1 is selected as the reference, e.g., having zero phase angle. FIG. 11B shows back emfs of coils 1, 2, and 3. Back emfs of other coils could also be expressed but are omitted for simplicity.

The relationship between the magnet pole pitch and coil pitch sets the machine periodicity. The total magnet pitch and coil pitch must be the same to wrap the linear structure shown in FIG. 10A into a cylindrical structure. Therefore, the coil pitch and the magnet pitch are related by $$nL_c = pL_p \quad (20)$$

where n is an integer and p is an even integer number, denoting number of coils and number of magnetic poles, respectively. The phase windings are constructed by appropriately connecting the individual coils to achieve the voltage vectors shown in FIG. 11B. For example, consider $$\frac{Lc}{Lp} = \frac{26}{18}.$$

Using (19), the angular position of the k-th coil back emf is $$(k-1)\pi\frac{26}{18}$$

radians or (K−1)260 degrees. Using (20), the machine needs to have 18 coils and 26 poles, or an integer multiple of these numbers. All the back emfs cover 360° with any two adjacent vectors to be 20° apart, as shown in FIG. The available back emf are connected to form three three-phase sets following FIG. 12B. For example, phase $A_{P2}$ is $E_1$-$E_{10}$, formed by connecting coils $X_1 X_1'$ and $X_{10} X_{10}'$ in opposite polarity, as shown FIG. 12C Similar connections are made to form other phases.

The foregoing method for coil connection leads to zero mutual inductance. Mutual inductance between two windings depends on the average of the product between the two corresponding winding functions. Winding functions for phases $A_{P2}$, $B_{P2}$, and $A_{P3}$ with the given connection pattern are shown in FIG. 12D. The winding function for each phase consists of two non-zero, bi-polar intervals. In the preferred configuration, the product of any two winding functions is zero, leading to the zero mutual inductance. The inductance matrix corresponding to the passive ports, matrix $L_{PP}$, is diagonal, meeting the requirement in Table I with zero mutual M-terms.

The active rectifier is axially split from the passive rectifier to eliminate the mutual coupling between the passive-rectifier phases and active-rectifier phases, i.e., all entries in the matrix $L_{AP}$ are zero. A standard distributed winding is employed for the active-rectifier AC ports, as shown in FIG. 13A. This winding approach results in a balanced three-phase back emf as shown in FIG. 13B.

An FEA model of a 10 MW generator, suitable for offshore wind turbines, is coupled to a circuit simulator to verity the present integrated generator-rectifier operation. The FEA model is coupled to a circuit simulator to verify the impact of magnetic coupling among the different phases on the DC-bus power ripple as well as the generator torque ripple. The FEA verification focused on the passive rectifier portion because of the innovative winding configuration.

The generative structure created using Altair Flux™ is shown in FIG. 14A. For the direct-drive generator, the inner rotor radius R is preferred to be as large as possible to increase the generator tip speed, thereby improving the power density. A six-meter radius is the practical constraint because an object of this size is the biggest that could fit in the existing vehicles. The airgap length is chosen to be 12 mm, following the design rule by the National Renewable Energy Laboratory (NREL). Two hundred sixty poles are chosen for convenience because one fundamental period of the machine requires 26 poles. This selection leads to the pole pitch of 145 mm, well within the range reported by NREL. Each group or 26 poles corresponds to 18 stator coils to form the back emf vectors as shown in FIG. 14B.

Figures 12A, 12B, 12C:
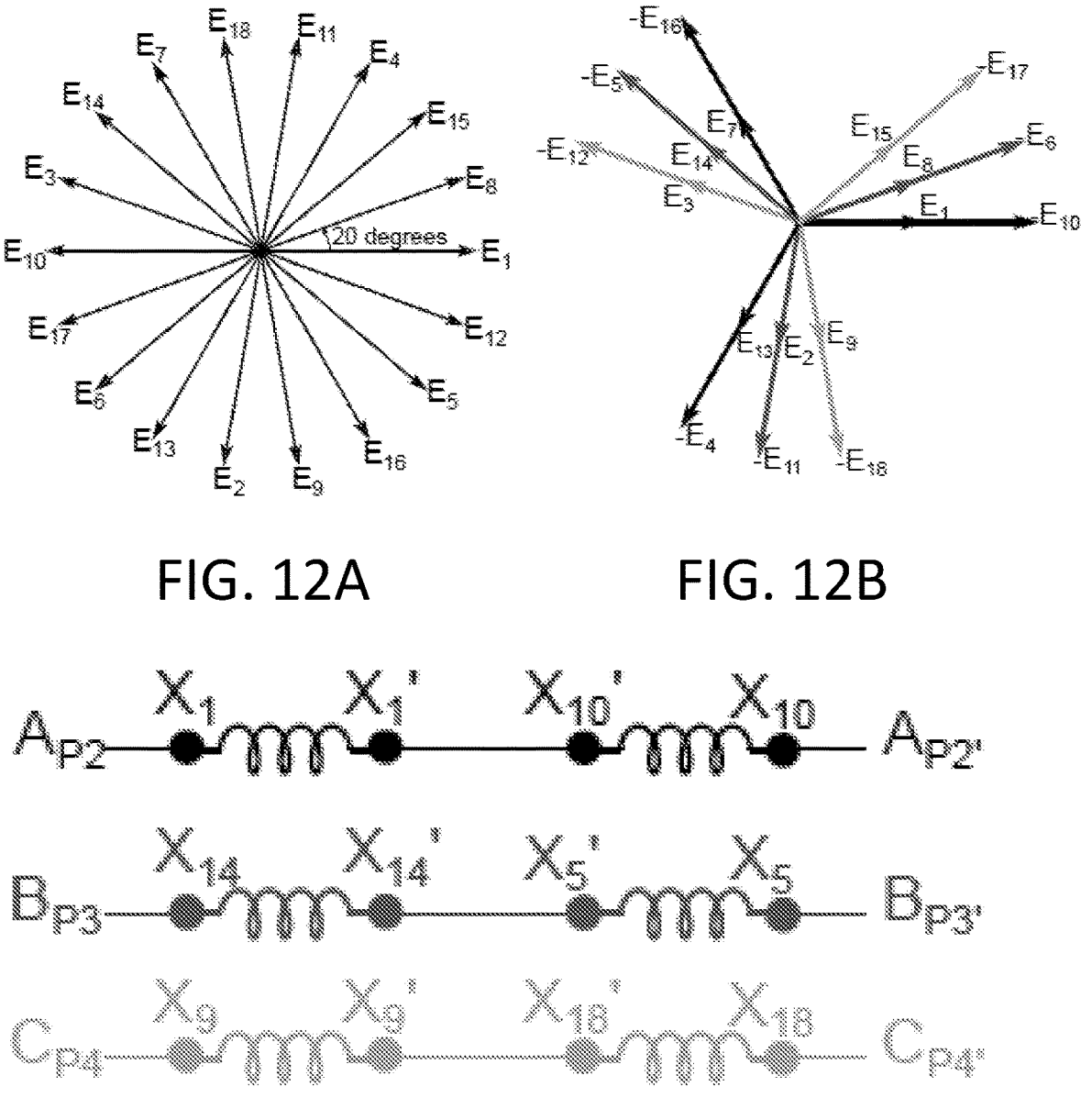
Figure 12D:
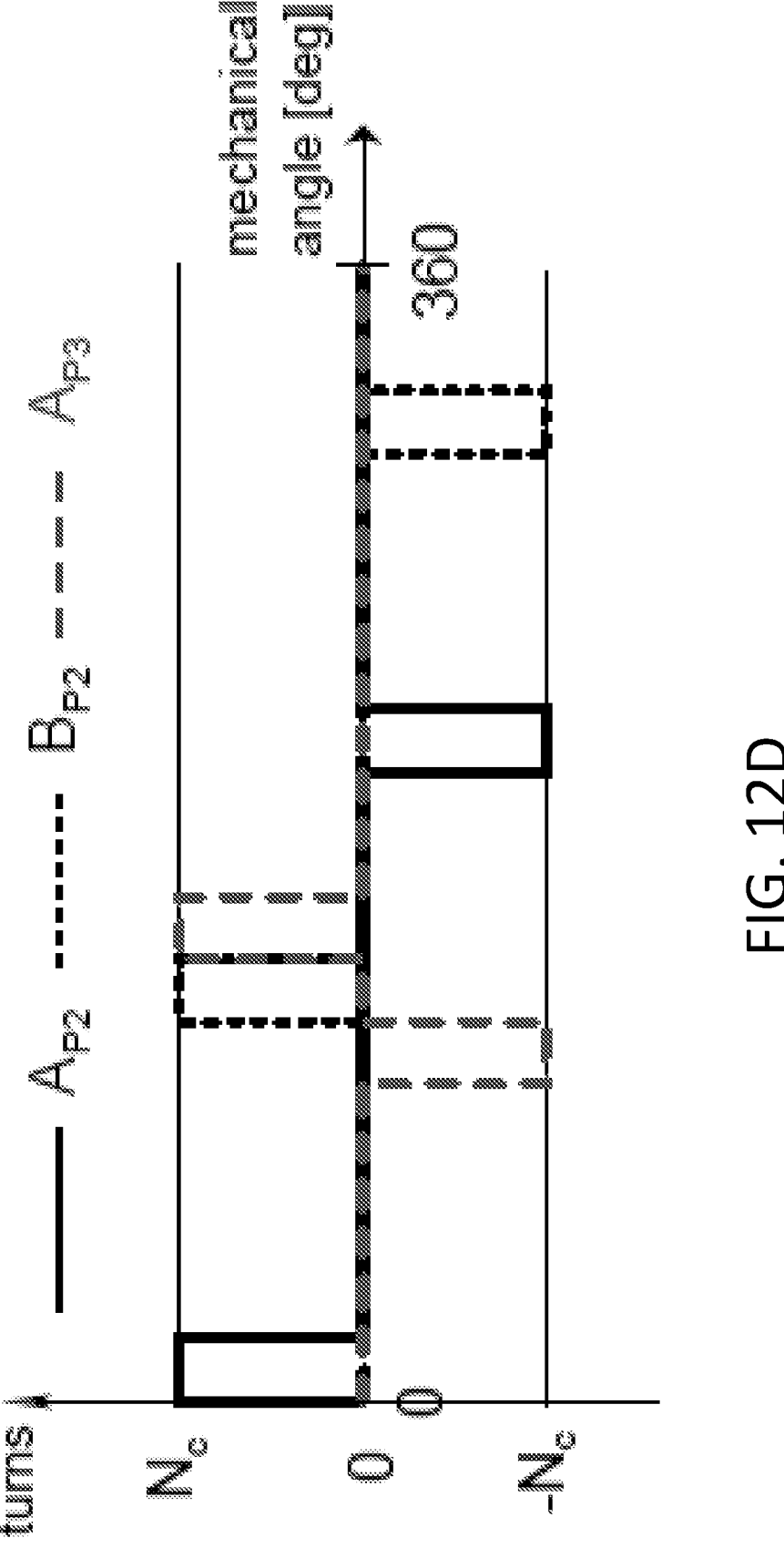

For each group of 18 consecutive coils, the connection pattern of FIG. 12A is implemented to form nine phases. The same phase from each of the ten periods is serially connected to form a complete machine phase. The generator rated speed is chosen to be 9.6 rpm, typical for 10-MW direct-drive wind turbines. The current density is set as 4 A/mm$^2$ to facilitate air cooling. The magnets are Halbach type to reduce the rotor yoke size. The magnet thickness is selected to achieve 0.045 pu phase reactance. Using (14), the DC-bus voltage is 1.2 pu assuming $R_i^{pu}=0.011$. As the DC-side voltage of the active rectifier is 0.35 pu, according to constraint (12), the active rectifier provides 2.9 MW of the total 10 MW power. The stack length is calculated for the passive-rectifier section to provide 7.1 MW. The dimensions are summarized in FIG. 14B and flux density of the structure is shown in FIG. 14C.

Back emfs of port P1, phase A of port P2 and P3 are shown in FIG. 14D confirming the desired 120° phase shift between phases in the same port and 20° phase shift between different ports. FIG. 14E shows the inductance matrix measured from the FEA model. The present connection pattern eliminates mutual coupling between different phases, as seen by the dominance of diagonal matrix elements.

A circuit simulation was created using FIG. 7 with the AC ports replaced by the Altair Flux™ FEA model to evaluate the generator performance in the presence of the power electronics. Electrical parameters are calculated based on the back emf produced by the FEA model as shown in FIG. 14C the measured inductance as shown in FIG. 14D, the base power of 10 MW, and the and the controlling equations discussed above. Parameter values are summarized in FIG. 14B

The FEA verification shown in FIG. 15A-15C confirms feasibility of the present generator configuration. The currents in port P1 are shown in FIG. 15A. The small ripple component during the conduction period of each phase is due to the phase-shifting effects. There is no substantial perturbation due to mutual coupling between different phases. The DC-bus current is shown in FIG. 15B with the ripple component at 18 times the back-emf fundamental frequency. The peak-to-peak ripple is 2.6% of the average current value, which agrees with the prediction using the per-unit circuit for the case Xpu=0.047, as shown in FIG. 8. The generator instantaneous torque is shown in FIG. 15C. The peak-to-peak torque ripple is measured as 0.86% the average value.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An integrated multi-port generator-rectifier device, comprising:

multiple passive output ports provided from a plurality of passive-rectifier windings on a common, single magnetic structure, wherein the passive-rectifier windings interact with a plurality of magnetic poles, wherein the passive rectifier windings are serially connected, wherein each of the passive rectifier windings comprises a pitch that is a fraction of magnet pole pitch and a pattern to magnetically decouple back emf phases of the separate rectifiers, the device further comprising an active port provided by an active rectifier.

2. The device of claim 1, wherein the passive-rectifier windings comprise a winding function that consists of two non-zero, bi-polar intervals such that a product of any two winding functions is zero, leading to zero mutual inductance.

3. The device of claim 2, comprising three six-pulse passive-rectifier windings in a three-phase design, wherein each of the three passive-rectifier windings includes multiple fractional-pole-pitch coils in serial arrangement to create a primary back emf phase of 120° from primary back emf phases of the other two passive-rectifier windings, and to create two phase-shifted secondary back emf phases at a predetermined phase shift from each and from the primary back emf phase.

4. The device of claim 3, wherein the predetermined phase shift is 60/(k−1),° wherein k=the total number of ports including the passive output ports and the active port.

5. The device of claim 1, having no DC-side filter capacitors in the passive output ports.

6. The device of claim 1, wherein coil and pole pitch of the passive-rectifier windings are related by:

$nL_c = pL_p$, where n is an integer and p is an even integer number, denoting a number of coils and a number of magnetic poles, respectively, $L_c$ and $L_p$ are coil pitch and pole pitch, respectively.

7. The device of claim 6, wherein windings of each of the passive-rectifier windings comprise coils connected in opposite polarity to create the two secondary back emf phases.

8. The device of claim 1, wherein the active rectifier comprises a winding axially split from the passive-rectifier windings.

9. The device of claim 8, comprising control to control the active rectifier as a DC current source that draws power dependent on generator rotation speed to achieve maximum power-point tracking.

10. The device of claim 9, connected between a wind-powered generator and a power grid interface.

11. The device of claim 9, wherein the control controls a majority of power to be ported through the passive ports.

12. The device of claim 1, wherein the windings are on a rotor or stator and the magnetic poles are on the other of the rotor or stator.

13. The device of claim 12, wherein the magnetic poles comprise magnets mounted between retaining rings forming one of the rotor or stator.

14. An integrated multi-port generator-rectifier device, comprising:

a plurality of ports, wherein one of the plurality of ports powers an active rectifier and the remaining power capacitor-less passive rectifiers, wherein the active rectifier is axially split from the passive rectifiers, wherein the passive rectifiers share a common and single magnetic structure comprising a plurality of magnetic poles, wherein each passive rectifier has a three-phase winding set, and each phase is 120-degree phase shifted from the other two, wherein each phase winding in the three-phase winding set comprises serially connected multiple coils, wherein each coil comprises a pitch that equals a fraction of a magnetic-pole pitch of the magnetic poles; wherein a coil connection pattern of the serially connected coils is configured such that each phase winding comprises a zero-average winding function that consists of two non-zero, bi-pole intervals such that any two phases on the passive-port magnetic structure are magnetically decoupled to provide zero mutual inductance.

* * * * *